(12) United States Patent
Zakharchenko et al.

(10) Patent No.: US 10,891,711 B2
(45) Date of Patent: Jan. 12, 2021

(54) IMAGE PROCESSING METHOD AND APPARATUS

(71) Applicant: SAMSUNG ELECTRONICS CO., LTD., Suwon-si (KR)

(72) Inventors: Vladyslav Zakharchenko, Seoul (KR); Kwang-pyo Choi, Gwacheon-si (KR); Hyun-jung Kim, Suwon-si (KR); Chang-hyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/603,651

(22) PCT Filed: Apr. 13, 2017

(86) PCT No.: PCT/KR2017/003997
§ 371 (c)(1),
(2) Date: Oct. 8, 2019

(87) PCT Pub. No.: WO2018/190446
PCT Pub. Date: Oct. 18, 2018

(65) Prior Publication Data
US 2020/0118241 A1    Apr. 16, 2020

(51) Int. Cl.
*H04N 13/189*    (2018.01)
*G06T 3/00*    (2006.01)
(Continued)

(52) U.S. Cl.
CPC ......... *G06T 3/0037* (2013.01); *H04N 13/161* (2018.05); *H04N 13/178* (2018.05); *H04N 13/189* (2018.05)

(58) Field of Classification Search
None
See application file for complete search history.

(56) References Cited

U.S. PATENT DOCUMENTS 2,424,601 A    7/1947    Crouch
7,656,403 B2    2/2010    Grover et al.
(Continued)

FOREIGN PATENT DOCUMENTS

KR    10-2015-0129548 A    11/2015
KR    10-2016-0125708 A    11/2016
(Continued)

OTHER PUBLICATIONS

International Search Report (PCT/ISA/210) dated Jan. 9, 2018 issued by the International Searching Authority in International Application No. PCT/KR2017/003997.
(Continued)

*Primary Examiner* — Eileen M Adams
(74) *Attorney, Agent, or Firm* — Sughrue Mion, PLLC

(57) ABSTRACT

Provided is an image processing method including: generating an omnidirectional spherical image; determining information regarding a director's view that indicates some regions of the omnidirectional spherical image; generating a projection image by projecting the omnidirectional spherical image to a development view of a polyhedron; dividing, from the projection image, a director's view projection image corresponding to the director's view, based on the information regarding the director's view; reshaping the director's view projection image into a director's view rectangular image by moving a location of at least one of pixels of the director's view projection image; and generating a bitstream which the director's view rectangular image is encoded into.

5 Claims, 25 Drawing Sheets

(51) Int. Cl.
*H04N 13/178* (2018.01)
*H04N 13/161* (2018.01)

(56) References Cited

U.S. PATENT DOCUMENTS

| | | |
|---|---|---|
| 10,397,297 B2 | 8/2019 | Park et al. |
| 2006/0257049 A1* | 11/2006 | Lelescu ................. G06T 3/0018 382/276 |
| 2014/0132598 A1 | 5/2014 | Narukawa |
| 2016/0360213 A1* | 12/2016 | Lee .......................... H04N 1/60 |
| 2017/0084086 A1* | 3/2017 | Pio ............................ G06T 7/60 |
| 2018/0090052 A1* | 3/2018 | Marsh ...................... G09G 3/20 |
| 2018/0278916 A1 | 9/2018 | Kim et al. |

FOREIGN PATENT DOCUMENTS

| | | |
|---|---|---|
| KR | 10-2017-0017700 A | 2/2017 |
| WO | 2017/175910 A1 | 10/2017 |

OTHER PUBLICATIONS

Written Opinion (PCT/ISA/237) dated Jan. 9, 2018 issued by the International Searching Authority in International Application No. PCT/KR2017/003997.

\* cited by examiner

| video_parameter_set_rbsp( ) { | Descriptor |
|---|---|
| ... | |
| vps_360_extension_flag | u(1) |
| if( vps_360_extension_flag ) | |
|     vps_360_extension( ) | |
| ... | |
| } | |

| vps_360_extension ( ) { | Descriptor |
|---|---|
|   vps_offset_rotation_flag | u(1) |
|   vps_yaw_clip_flag | u(1) |
|   vps_pitch_clip_flag | u(1) |
|   if(vps_offset_rotation_flag ) { | |
|     yaw_center | i(16) |
|     pitch_center | i(16) |
|     roll_center | i(16) |
|     if (vps_yaw_clip_flag = = 1 ) { | |
|       yaw_range | u(16) |
|     } | |
|     if (vps_pitch_clip_flag = = 1 ) { | |
|       pitch_range | u(16) |
|     } | |
|   } | |
| } | |

IMAGE PROCESSING METHOD AND APPARATUS

TECHNICAL FIELD

The present disclosure relates to an image processing method and apparatus.

BACKGROUND ART

With recent developments in technology and apparatuses regarding virtual reality (VR), VR apparatuses using the same have been in the spotlight. Such VR apparatuses are widely used in various fields such as entertainment, education, office work, and medical treatment. Also, due to the distribution of VR apparatuses such as head-mounted displays (or head mount displays) (HMDs), the way in which people enjoy video content has changed. The VR apparatuses provide content, of which a field of view is changeable according to a user's field of view, and users may feel as if they are in virtual space accordingly. Thus, applications have been developed that are capable of supporting the reproduction of panoramic images having immersiveness and providing video game services by using the VR apparatuses.

Since VR images displayed on a VR apparatus move according to a gaze of a user wearing the VR apparatus, the VR apparatus needs to include all surrounding images around the user. That is, the VR images provided by the VR apparatus are images in all directions with respect to the user, that is, 360°×180° images. Therefore, along with the interest in VR apparatuses, an interest in processing 360°×180° images is increasing.

According to a method of processing 360°×180° images of the related art, image quality may deteriorate because large-size images degrade the processing efficiency and require a lot of power and part of the images may be lost. Therefore, there is a need for an image processing method apparatus that are efficient and provide high-quality images.

DESCRIPTION OF EMBODIMENTS

Technical Problem

Provided are an image processing method and apparatus. In particular, provided are an image processing method and apparatus that are efficient and provide high-quality images.

Solution to Problem

According to an aspect of the present disclosure, there is provided an image processing method including: generating an omnidirectional spherical image; determining information regarding a director's view that indicates some regions of the omnidirectional spherical image; generating a projection image by projecting the omnidirectional spherical image to a development view of a polyhedron; dividing, from the projection image, a director's view projection image corresponding to the director's view, based on the information regarding the director's view; reshaping a director's view rectangular image into a rectangular image by moving a location of at least one of pixels of the director's view projection image; and generating a bitstream which the director's view rectangular image is encoded into.

The information regarding the director's view may include a direction vector indicating a center of the director's view from a center of the omnidirectional spherical image, information regarding a horizontal length of the director's view, and information regarding a vertical length of the director's view.

The information regarding the director's view is included in Supplemental Enhancement Information (SEI) parameters of a Network Abstraction Layer (NAL) unit within a bitstream.

The polyhedron comprises a polyhedron may include at least one triangle having the same shape and area.

The projection image may include an icosahedral projection image or an octahedral projection image.

When the projection image is the icosahedral projection image, the reshaping may include: determining, for each row, a horizontal movement direction of pixels included in each row; and vertically moving, in an upward and downward direction, the pixels included in each row according to the determined horizontal movement direction.

When the projection image is the octahedral projection image, the reshaping may include: determining, for each row, a first movement direction of pixels included in each row; moving in parallel the pixels included in each row in a diagonal direction, according to the determined first movement direction; determining, for each column, a second movement direction of pixels included in each column; and horizontally moving, in a left or right direction, the pixels included in each column according to the determined second movement direction.

The image processing method may further include: reshaping the omnidirectional spherical image into a rectangular image by moving a location of at least one of pixels of the projection image; and generating a bitstream which the rectangular image of the omnidirectional spherical image is encoded into.

The generating of the omnidirectional spherical image may include: obtaining a 360°×180° panoramic image; and replacing a certain region of the panoramic image with an artificial image.

According to an aspect of the present disclosure, there is provided an image processing method including: receiving a bitstream that is encoded; obtaining, from the bitstream, reshaping information, polyhedron information, and information regarding a director's view indicating some regions of an omnidirectional spherical image; generating a director's view rectangular image by decoding the bitstream; based on the reshaping information and the information regarding the director's view, recovering a director's view projection image by moving a location of at least one of pixels of the director's view rectangular image; and based on the polyhedron information, generating a back-projection image by assembling the director's view projection image as a polyhedron and back-projecting the polyhedron.

The information regarding the directors' view may include information regarding a direction vector indicating a center of the director's view from a center of the omnidirectional spherical image, information regarding a horizontal length of the director's view, and information regarding a vertical length of the director's view.

The director's view projection image has a shape in which part of an icosahedral projection image or an octahedral projection image is divided.

The image processing method may further include: receiving information regarding an image mode indicating whether to reproduce an image in a full mode or a director's view mode; when the information regarding the image mode indicates the full mode, generating a rectangular image of the omnidirectional spherical image by decoding the bitstream, recovering the projection image of the omnidirectional spherical image by moving a location of at least one of pixels of the rectangular image of the omnidirectional spherical image, and reproducing the omnidirectional spherical image by back-projecting the projection image of the omnidirectional spherical image; and when the information regarding the image mode indicates the director's view mode, reproducing an image according to the director's view by back-projecting the projection image of the omnidirectional spherical image.

A region of the director's view rectangular image, which corresponds to a field of view of a user device, may be reconstructed in high quality, and a region outside the field of view of a user device may be reconstructed in low quality.

According to an aspect of the present disclosure, there is provided an image processing apparatus including: a receiver configured to receive a bitstream that is encoded; a controller configured to obtain, from the bitstream, reshaping information, polyhedron information, and information regarding a director's view indicating some regions of an omnidirectional spherical image, generate a director's view rectangular image by decoding the bitstream, reconstruct a director's view projection image by moving a location of at least one of pixels of the director's view rectangular image based on the reshaping information and the information regarding the director's view, and generate a back-projection image by assembling the director's view projection image as a polyhedron and back-projecting the polyhedron based on the polyhedron information; and a memory configured to store data necessary to operate the controller.

According to an embodiment, the present disclosure provides an image processing method that is efficient and provides a high-quality image and an image processing apparatus.

BRIEF DESCRIPTION OF DRAWINGS

FIG. 22 illustrates parameters indicating information regarding a director's view, according to an embodiment.

MODE OF DISCLOSURE

The term "unit" is a software component or a hardware component such as a field-programmable gate array (FPGA) or an application specific integrated circuit (ASIC) and performs a certain function. However, the 'unit' is not limited to software or hardware. The 'unit' may be configured to be included in a storage medium on which addressing may be performed or may be configured to execute one or more processors. For example, the "unit" includes components (e.g., software components, object-oriented software components, class components, and task components), processes, functions, attributes, procedures, sub-routines, segments of program codes, drivers, firmware, micro codes, circuits, data, database, data structures, tables, arrays, and variables. Components and functions provided in the "units" may be combined into a smaller number of components and "units" or separated into additional components and "units".

With reference to the accompanying drawings below, it will be described in detail so that one of ordinary skill in the art may easily perform embodiments of the disclosure. However, one or more embodiments of the present disclosure may be embodied in many different forms and should not be construed as being limited to the embodiments set forth herein For clarity, portions that are irrelevant to the descriptions will be omitted.

The terms used in this specification are those general terms currently widely used in the art in consideration of functions regarding the present disclosure, but the terms may vary according to the intention of one of ordinary skill in the art, precedents, or new technology in the art. Also, specified terms may be selected by the applicant, and in this case, the detailed meaning thereof will be described in the detailed description of the present disclosure. Thus, the terms used in the specification should be understood not as simple names but based on the meaning of the terms and the overall description of the disclosure.

Figure 1:
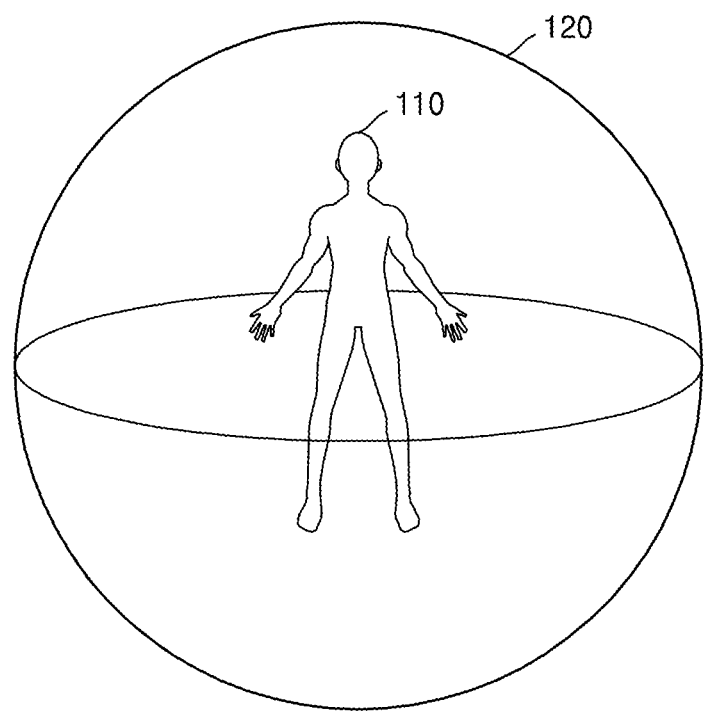
FIG. 1 illustrates an omnidirectional spherical image (a 360°×180° image).

FIG. 1 illustrates an omnidirectional spherical image (a 360°×180° image).

As shown in FIG. 1, the omnidirectional spherical image is an image 120 showing an ambient environment surrounding a certain location at 360×180 degrees with respect to a certain location 110. When a user wears a virtual reality (VR) apparatus, the image showing an ambient environment surrounding the user at 360×180 degrees in virtual reality may be an omnidirectional spherical image. The VR apparatus may provide the 360°×180° image to the user, and even when the user wearing the VR apparatus moves or turns his/her gaze, the VR apparatus may provide an appropriate image. A process of obtaining the omnidirectional spherical image will be described as below.

The image processing apparatus obtains images in at least two directions. According to an embodiment, the image processing apparatus may obtain the images in at least two directions by capturing an ambient environment surrounding the image processing apparatus by using a camera. In this case, the image processing apparatus may capture the ambient environment surrounding the image processing apparatus by using at least one camera. According to an embodiment, the camera may be a component included in the image processing apparatus or separated therefrom. Also, the image processing apparatus may capture the ambient environment in a panoramic manner by using the camera, or capture the ambient environment in all directions such as a front and rear direction, a left and right direction, or an up and down direction.

Also, according to an embodiment, the image processing apparatus may receive an image from an external device and thus may obtain the images in at least two directions. That is, the external device transmits an image to the image processing apparatus by capturing the ambient environment and generating a virtual image, and the image processing apparatus may receive the image and thus may obtain the images in at least two directions.

Figure 2:
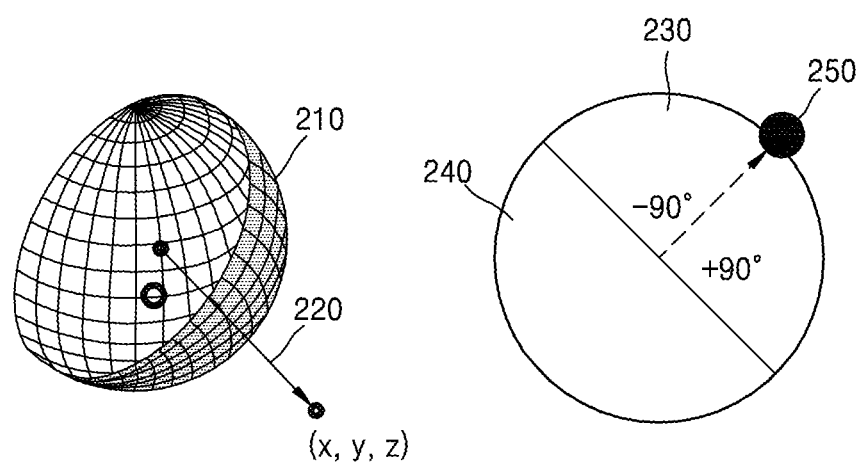
FIG. 2 illustrates a concept of a director's view, according to an embodiment.

FIG. 2 illustrates a concept of a director's view, according to an embodiment.

Since the omnidirectional spherical image is used to process all ambient environments surrounding the user, the amount of operations to be processed may increase accordingly. In the case of a device having a limited central processing unit (CPU) or random access memory (RAM) resources, the increase in the amount of operations delays a real-time processing speed and deteriorates the image quality. To solve the above problems, a method of processing a director's view image showing only some regions instead of the whole 360°×180° image is suggested.

The director's view indicates regions subdivided from the video content. That is, when a field of view of the omnidirectional spherical image is 360×180 degrees, a field of view of the director's view becomes narrower than that of the omnidirectional spherical image and thus may be less than 360×180 degrees. For example, the field of view of the director's view may be hemispherical (180°×180°).

A direction and a size of a region corresponding to the director's view may be determined by a content provider. The director's view according to an embodiment may be obtained from at least one camera sensor. According to an embodiment, a direction of a basic director's view may be determined according to a movement direction of the camera sensor, and a width and a height of the basic director's view may be determined according to a viewing angle of the camera sensor. Also, the director's view according to an embodiment may be manually determined by a selection of the content provider when or after the image is captured. That is, the content provider may determine, as the director's' view, a region, which corresponds to a scene that is considered to be important or a scene for drawing the user's attention, from among the omnidirectional spherical image.

According to another embodiment, a direction and a size of the region corresponding to the director's view may be automatically determined through image analysis. For example, a region, where a relatively large amount of motion is detected, or a region having a relatively high pixel resolution may be determined as the director's view.

According to another embodiment, the director's view may be determined in response to a user's request. For example, when the user selects a certain region from the omnidirectional spherical image by using the VR apparatus, a request for providing an image of the selected region may be transmitted to a server.

FIG. 2 illustrates an example in which a director's view 210 is a hemispherical image. Hereinafter, various methods of processing the director's view 210 on the assumption that the director's view 210 is the hemispherical image will be described. However, the director's view 210 is not necessarily be hemispherical, and the image processing method described in the specification may be identically applied to the director's view 210 that is greater or smaller than the hemispherical image. Therefore, the director's view 210 should not be construed as being limited to the hemispherical image, and it is enough to understand that the director's view 210 indicates some regions of the omnidirectional spherical image.

Referring to FIG. 2, the director's view 210 may be expressed as a direction vector 220 indicating the center of the director's view from the center of the omnidirectional spherical image, horizontal viewing information and vertical viewing information of the director's view. In this case, the direction vector 220 may be expressed as three-dimensional (3D) space coordinates (x, y, z). The direction vector 220 is a normal vector of a curved surface 250 indicated by the direction vector. When the direction vector 220 is determined on 2D plane coordinates and expressed as Cartesian coordinates or Polar coordinates, it may be required to convert the Cartesian coordinates or Polar coordinates into a 3D space coordinate system.

The horizontal viewing information of the hemispherical director's view 210 indicates 180 degrees, and the vertical viewing information thereof indicates 180 degrees. When the director's view is hemispherical, a region within 90 degrees vertical and 90 degrees horizontal may be set as a region 230 of the director's view with respect to a direction indicated by the direction vector 220. In this case, content is not received/transmitted to a region 240 except for the region 230 corresponding to the director's view from among the omnidirectional spherical image.

Information regarding the director's view may be encoded by the image processing apparatus together with the video content and may be included in a bitstream. In this case, the information regarding the director's view may be included in Supplemental Enhancement Information (SEI) parameters of a Network Abstraction Layer (NAL) unit in a bitstream.

A bitstream encoded by the image processing apparatus are stored in a content server, and the VR apparatus (e.g., a HMD) may receive a bitstream from the content server and may perform decoding. In this case, the VR apparatus may select an omnidirectional spherical image mode or a director's view mode according to a selection. When the director's view mode is selected in the VR apparatus, the VR apparatus may perform decoding and rendering on the director's view image, based on the information regarding the director's view that is obtained from the SEI parameters of the NAL unit within a bitstream.

Parameters used to express the information regarding the director's view will be described below in detail with reference to FIG. 22.

Figure 3:
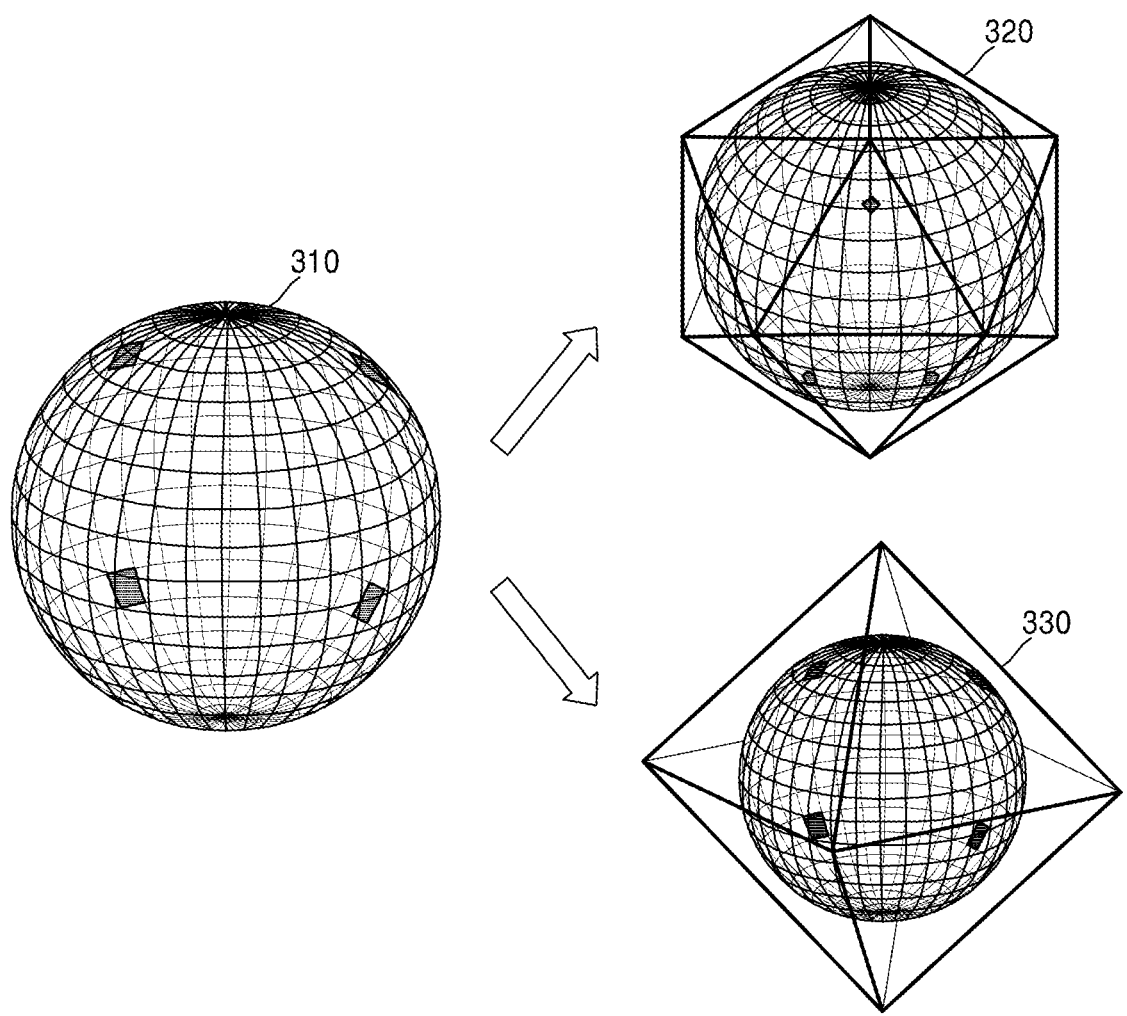
FIG. 3 is a diagram of a process in which an image processing apparatus projects an omnidirectional spherical image to a polyhedron, according to an embodiment.

FIG. 3 is a diagram of a process in which an image processing apparatus projects an omnidirectional spherical image to a polyhedron, according to an embodiment.

For effective image compression, the image processing apparatus converts a 3D spatial image into a 2D plane image before the encoding is performed. The 3D spatial image may be converted into the 2D plane image in various manners, and among them, an Equirectangular projection (ERP) method of equirectangularly projecting the omnidirectional spherical image requires too much operation, and thus a processing speed is delayed. It is because the ERP method has non-linear characteristics by which a conversion area decreases as a pole of the omnidirectional spherical image comes close. Accordingly, in the present specification, a polyhedral projection method, by which linearity is maintained while the 3D spatial image is converted into the 2D plane image, will be used. A polyhedron may include at least one triangle having the same shape and area. In this case, a surface of the polyhedron may include a different polygon including at least two triangles. For example, a rectangle including at least two identical triangles may form one surface of the polyhedron.

Referring to FIG. 3, the image processing apparatus may project an obtained omnidirectional spherical image 310 to an icosahedron 320 or an octahedron 330 that is a polyhedron. That is, the image processing apparatus may generate a projection image by projecting an image to a development view of the icosahedron 320 or the octahedron 330. An image projected to the icosahedron 320 is an icosahedral projection image, and an image projected to the octahedron 330 is an octahedral projection image.

Hereinafter, as shown in FIG. 3, the image processing processes will be described based on an example in which the omnidirectional spherical image 310 is projected to the icosahedron 320 or the octahedron 330. However, as described above, the polyhedron is not limited to the icosahedron 320 or the octahedron 330, and image processing processes may be performed by projecting the obtained omnidirectional spherical image 310 to polyhedrons of various shapes.

Figure 4:
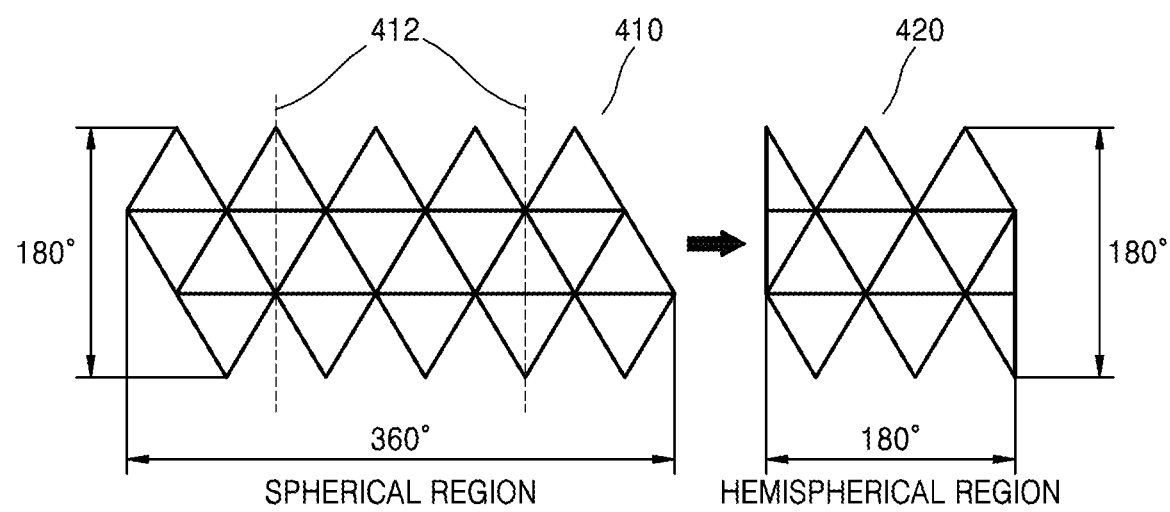
FIG. 4 is a diagram of an icosahedral projection image according to an embodiment.

FIG. 4 is a diagram of an icosahedral projection image, according to an embodiment.

FIG. 4 illustrates a projection image 410 generated by projecting the omnidirectional spherical image 310 to the development view of the icosahedron 320. The projection image 410 is an icosahedral projection image generated by using an icosahedral projection method. The projection image 410 is the same as the development view of the icosahedron 320 to which the omnidirectional spherical image 310 is projected. That is, the projection image 410 has an area corresponding to a 360°×180° omnidirectional spherical image.

When the projection image 410 is obtained, the image processing apparatus divides an area corresponding to a director's view image from the projection image 410 to process a hemispherical director's view image. In particular, the image processing apparatus determines a boundary surface 412 of the director's view image. Then, the image processing apparatus obtains only a region included in the boundary surface 412 or divides the region corresponding to the director's view from the projection image 410 by using a method of cropping a region corresponding to an external portion of the boundary surface 412. A portion corresponding to the divided region is referred to as a director's view projection image 420. The director's view projection image 420 has an area corresponding to a 180°×180° hemispherical image.

According to an embodiment, the director's view projection image 420 divided from the projection image 410 has a shape that is a collection of equilateral triangles or right-angled triangles. The image processing apparatus according to an embodiment reshapes the director's view projection image 420, which is the collection of the equilateral triangles or the right-angled triangles, into a rectangular image. The director's view projection image 420 is a 2D image developed from the icosahedron 320, and thus as shown in FIG. 4, the director's view projection image 420 has a margin that is irrelevant to an image that is to be actually reproduced. Such a margin is merely a marginal space on the drawing, but in the image processing processes, the margin is data to be processed. Therefore, as a margin increases, the amount of data to be processed by the image processing apparatus increases, and thus the processing efficiency decreases. A process of reshaping the director's view projection image 420 into the rectangular image is a process of reducing the margin and unnecessary data to be processed by the image processing apparatus.

A process of reshaping the icosahedral projection image will be described in detail with reference to FIGS. 7 to 11.

Figure 5:
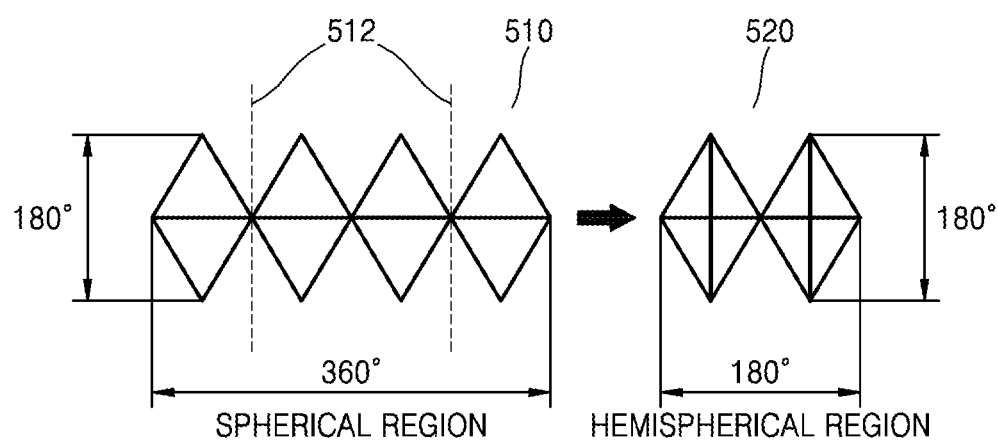
FIG. 5 is a diagram of an octahedral projection image according to an embodiment.

FIG. 5 is a diagram of an octahedral projection image, according to an embodiment.

FIG. 5 illustrates a projection image 510 generated by projecting the omnidirectional spherical image 310 to a development view of the octahedron 330. The projection image 510 is an octahedral projection image generated by using an octahedral projection method. The projection image 510 is the same as the development view of the octahedron 330 to which the omnidirectional spherical image 310 is projected. That is, the projection image 510 has an area corresponding to the 360°×180° omnidirectional spherical image.

When the projection image 510 is obtained, the image processing apparatus divides an area corresponding to a director's view image from the projection image 510 to process a hemispherical director's view image. In particular, the image processing apparatus determines a boundary surface 512 of the director's view image. Then, the image processing apparatus divides only a region corresponding to the director's view image from the projection image 510 by obtaining only a region corresponding to the inside of the boundary surface 512 or removing a region corresponding to the outside of the boundary surface 512. A portion corresponding to the divided region is referred to as a director's view projection image 520. The director's view projection image 520 has an area corresponding to a 180°×180° hemispherical image.

Like the director's view projection image 420 of FIG. 4, the director's view projection image 520 divided from the projection image 510 has a shape including a collection of equilateral triangles or right-angled triangles. As described above with reference to FIG. 4, the image processing apparatus performs a process of reshaping the director's view projection image 520 of FIG. 5 into a rectangular image.

A process of reshaping the octahedral image will be described in detail with reference to FIGS. 11 to 16.

Figure 6:
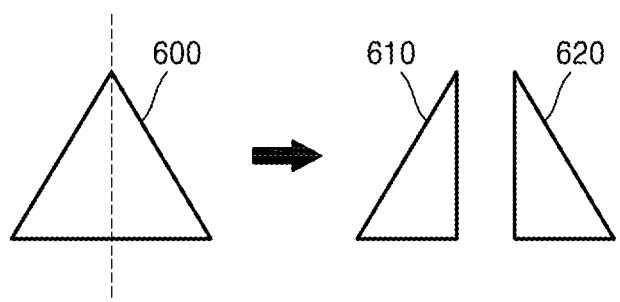
FIG. 6 is a diagram of components of a polyhedron, according to an embodiment.

FIG. 6 is a diagram of components of a polyhedron, according to an embodiment.

As described above with reference to FIGS. 4 and 5, the image processing apparatus performs a process of reshaping the director's view projection images 420 and 520 into rectangular images. The image processing apparatus may move locations of pixels of the director's view projection images 420 and 520 and thus may obtain the rectangular images.

According to an embodiment, the description that the locations of the pixels are moved indicates that pixel data is moved. That is, it does not mean that pixels are physically moved, but pixel data of a certain pixel is stored as pixel data of another pixel.

According to an embodiment, when the director's view projection images 420 and 520 are reshaped into the rectangular images, the image processing apparatus may generate the rectangular images by only moving the locations of the pixels without deleting the pixels or adding new pixels. That is, without a change in the total number of pixels or pixel data of the director's view projection images 420 and 520, the rectangular images may be generated by moving only the locations of the pixels. Therefore, the reshaped rectangular images have the same areas as the director's view projection images 420 and 520. According to an embodiment, because the locations of the pixels are moved to reshape the director's view projection images 420 and 520 into the rectangular images and the total number of pixels is equivalent to the pixel data, the rectangular images may be easily reconstructed as the director's view projection images 420 and 520 when it is possible to identify a history of moving the locations of the pixels and original locations of the pixels.

When the director's view projection images 420 and 520 are reshaped into the rectangular images, the image processing apparatus may use a method of setting a minimum unit including respective pixels and moving a location of the minimum unit. A polyhedron such as an icosahedron or an octahedron includes equilateral triangles. When a hemispherical director's view image is processed, as shown in FIGS. 4 and 5, an equilateral triangle 600, which is divided in half by the boundary surfaces 412 and 512 of the director's view images, exists. That is, it is understood that the director's view projection images 420 and 520 include combinations of right-angled triangles 610 and 620 divided from the equilateral triangle 600.

Accordingly, the image processing apparatus may perform reshaping by using the right-angled triangles 610 and 620 of FIG. 6 as basic units. In other words, the image processing apparatus may generate the rectangular image by appropriately arranging the right-angled triangles 610 and 620 forming the director's view projection images 420 and 520.

Hereinafter, reshaping by moving the pixels will be described in embodiments.

Figure 7:
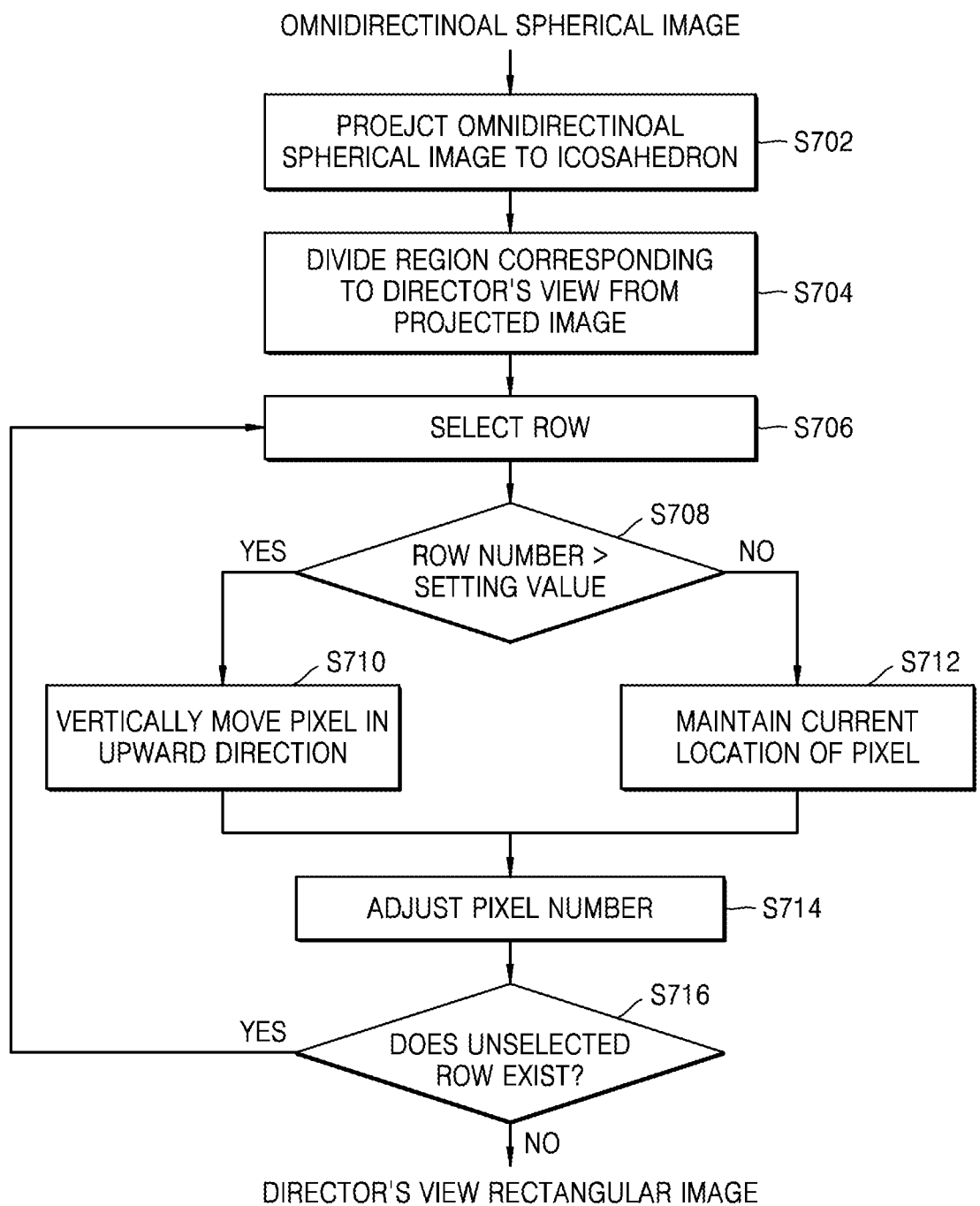
FIG. 7 is a flowchart of a method of reshaping an icosahedral projection image into a rectangular image, according to a first embodiment.

FIG. 7 is a flowchart of a method of reshaping an icosahedral projection image into a rectangular image, according to a first embodiment.

Referring to FIG. 7, in operation S702, the image processing apparatus projects an omnidirectional spherical image to an icosahedron. A projection image projected to the icosahedron has the same shape as the development view of the projection image 410 of FIG. 4.

When the projection image is obtained in operation S702, the image processing apparatus divides a region corresponding to the director's view from the projection image in operation S704. In particular, the image processing apparatus determines a boundary surface of the director's view image and divides the region corresponding to the director's view image from the projection image in a manner of obtaining a region included in the determined boundary surface or removing a region corresponding to an external portion of the boundary surface. A portion corresponding to the divided region is referred to as the director's view projection image 420. The director's view projection image 420 according to an embodiment has an area corresponding to a 180°×180° hemispherical image.

Then, in operation S706, the image processing apparatus selects one row on a plane on which the director's view projection image 420 is shown. In this case, a row, in which an uppermost pixel of the director's view projection image 420 is located, may be an x axis.

Figure 8:
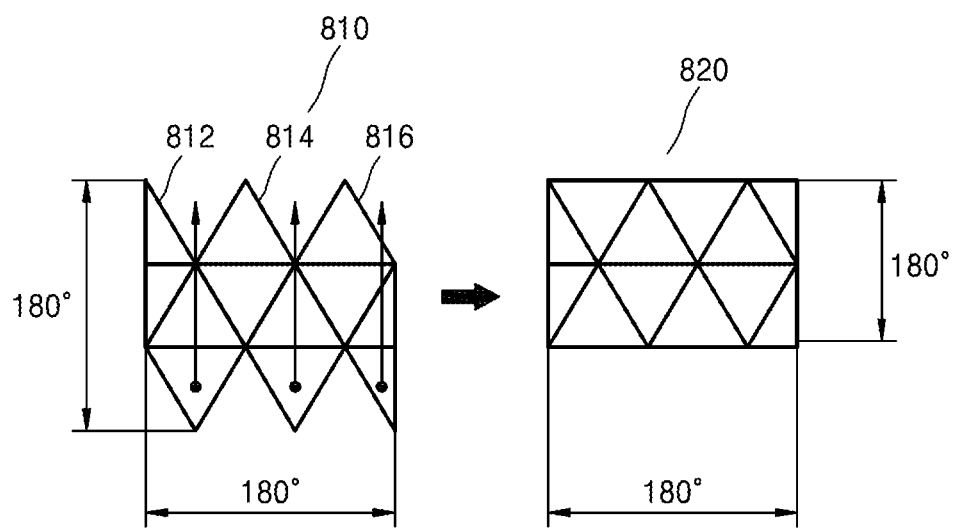
FIG. 8 is a diagram of a process of moving pixels of an icosahedral projection image, according to the first embodiment.

In operation S708, the image processing apparatus determines whether a row number of the selected row is greater than a setting value. FIG. 8 illustrates a director's view projection image 810 corresponding to the director's view projection image 420 of FIG. 4, and the director's view projection image 810 has a shape in which triangles are stacked in three layers. According to the first embodiment, the image processing apparatus may set the setting value to be two thirds of the total number of rows to move the lowermost triangles in an upward direction. In this case, the total number of rows corresponds to a vertical length of the director's view projection image 810. However, this is merely an example, and various standards may be set according to embodiments.

When it is determined that the row number of the selected row is greater than the setting value in operation S708, the image processing apparatus may proceed with operation S710 and may vertically move pixels included in the selected row to an upper portion. When it is determined that the row number of the selected row is less than or equal to the setting value in operation S708, the image processing apparatus may proceed with operation S712 and may maintain locations of the pixels included in the selected row.

Then, in operation S714, the image processing apparatus adjusts numbers (indices) of the pixels.

The image processing apparatus determines whether an unselected row exists in operation S716, and when an unselected row exists, the image processing apparatus returns to operation S706 and repeats the above operations.

Operations S706 to S716 are processes of reshaping the director's view projection image 810 of FIG. 8 into a director's view rectangular image 820 and will be described in detail with reference to FIG. 8.

FIG. 8 is a diagram of a process of moving pixels of an icosahedral projection image, according to the first embodiment.

Referring to FIG. 8, the director's view projection image 810 includes equilateral triangles or right-angled triangles, each of which includes at least one pixel. Also, each pixel included in each triangle of the director's view projection image 810 has pixel data. A row including an uppermost pixel is called an x axis, and row numbers increase downwards. When a setting value is set to be ⅔ of a total row length, that is, a height of the director's view projection image 810, pixels, which are included in rows having row numbers that are greater than ⅔ of the total row length, may be vertically moved to the upper portion.

Therefore, as shown in FIG. 8, the image processing apparatus according to the first embodiment may fill an upper margin of the director's view projection image 810 by vertically moving, to the upper portion, equilateral triangles 812 and 814 and a right-angled triangle 816 including pixels having row numbers which are greater than ⅔ of the total row length. For example, when a location of a pixel is expressed as P(x, y), Equation P(x', y')=P(x, y−⅔*h) may be used to shift the pixels to the upper portion. In this case, h indicates the total row length.

FIG. 8 illustrates the director's view rectangular image 820 generated as a result of the movement of the pixels. The director's view rectangular image 820 of FIG. 8 is to describe vertical movements of the pixels according to the first embodiment and FIG. 8 illustrates a vertical movement result under the assumption that only pixels of the director's view projection image 810, which have pixel data, are moved.

As the director's view projection image 810 is reshaped into the director's view rectangular image 820, the amount of data to be processed by the image processing apparatus decreases, but image data within a field of view of the director's view (e.g., 180°×180°) is retained, thus improving the image processing efficiency.

Figure 9:
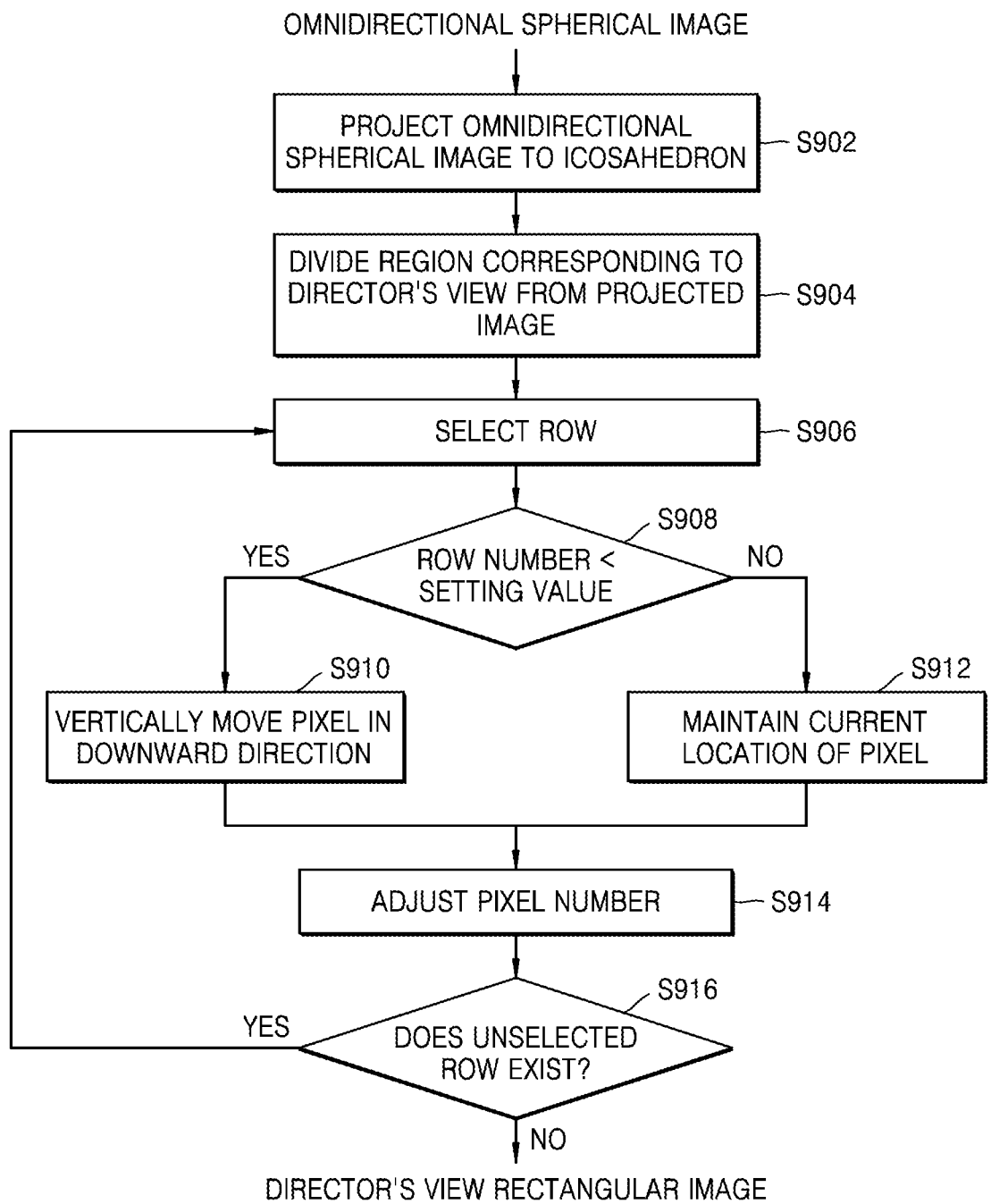
FIG. 9 is a flowchart of a method of reshaping an icosahedral projection image into a rectangular image, according to a second embodiment.

FIG. 9 is a flowchart of a method of reshaping an icosahedral projection image into a rectangular image, according to a second embodiment.

Referring to FIG. 9, in operation S902, the image processing apparatus projects the omnidirectional spherical image to the icosahedron. The projection image projected to the icosahedron has the same shape as the development view of the projection image 410 of FIG. 4.

When the projection image is obtained in operation S902, the image processing apparatus divides a region corresponding to the director's view from the projection image in operation S904. In particular, the image processing apparatus determines a boundary surface of the director's view image and divides the region corresponding to the director's view image from the projection image in a manner of obtaining a region included in the determined boundary surface or removing a region corresponding to an external portion of the boundary surface. A portion corresponding to the divided region is referred to as the director's view projection image 420, and the director's view projection image 420 has an area corresponding to a 180°×180° hemispherical image.

Then, in operation S906, the image processing apparatus selects one row on the plane on which the director's view projection image 420 is shown. In this case, a row, in which an uppermost pixel of the director's view projection image 420 is located, may be an x axis.

Figure 10:
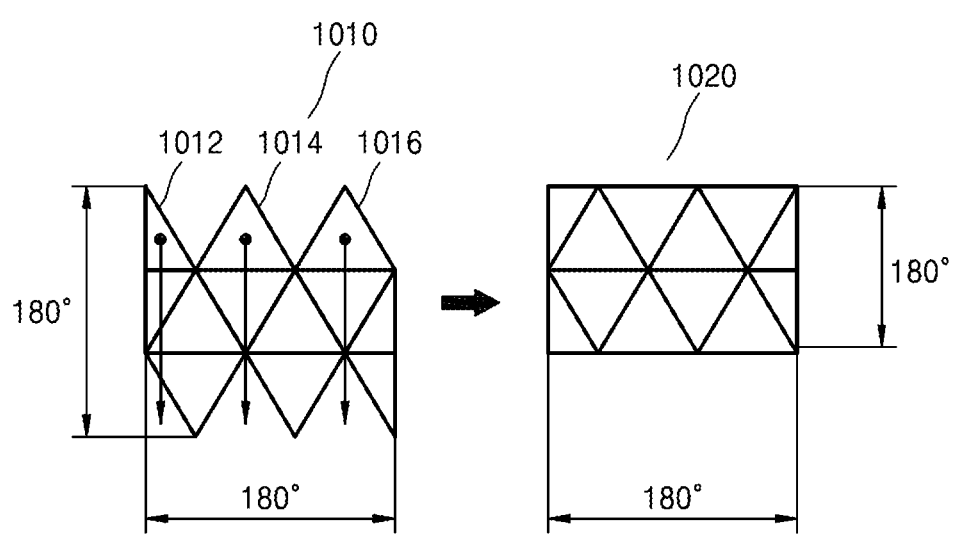
FIG. 10 is a diagram of a process of moving pixels of an icosahedral projection image, according to the second embodiment.

In operation S908, the image processing apparatus determines whether a row number of the selected row is less than a setting value. FIG. 10 illustrates a director's view projection image 1010 corresponding to the director's view projection image 420 of FIG. 4, and the director's view projection image 1010 has a shape in which triangles are stacked in three layers. According to the second embodiment, the image processing apparatus may set the setting value to be one third of the total number of rows to move the uppermost triangles in a downward direction. In this case, the total number of rows corresponds to a vertical length of the director's view projection image 1010. However, this is merely an example, and various standards may be set according to embodiments.

When it is determined that the row number of the selected row is less than the setting value in operation S908, the image processing apparatus may proceed with operation S910 and may vertically move pixels included in the selected row to a lower portion. When it is determined that the row number of the selected row is greater than the setting value in operation S908, the image processing apparatus may proceed with operation S912 and may maintain locations of the pixels included in the selected row.

Then, in operation S914, the image processing apparatus adjusts numbers (indices) of the pixels.

The image processing apparatus determines whether an unselected row exists in operation S916, and when an unselected row exists, the image processing apparatus returns to operation S906 and repeats the above operations.

Operations S906 to S916 are processes of reshaping the director's view projection image 810 of FIG. 10 into a director's view rectangular image 1020 and will be described in detail with reference to FIG. 10.

FIG. 10 is a diagram of a process of moving pixels of an icosahedral projection image, according to the second embodiment.

Referring to FIG. 10, the director's view projection image 1010 according to the embodiment includes equilateral triangles or right-angled triangles, each of which includes at least one pixel. Also, each pixel included in each triangle of the director's view projection image 1010 has pixel data. A row including an uppermost pixel is called an x axis, and row numbers increase downwards. When the setting value is set to be ⅓ of the total row length, that is, a height of the director's view projection image 1010, pixels, which are included in rows having row numbers that are less than ⅓ of the total row length, may be vertically moved to the lower portion.

Therefore, as shown in FIG. 10, the image processing apparatus according to the second embodiment may fill a lower margin of the director's view projection image 1010 by vertically moving, to the lower portion, a right-angled triangle 1012 and equilateral triangles 1014 and 1016 including pixels having row numbers which are less than ⅓ of the total row length. For example, when a location of a pixel is expressed as P(x, y), Equation P(x', y')=P(x, y+⅔*h) may be used to shift the pixels to the lower portion. In this case, h indicates the total row length.

FIG. 10 illustrates the director's view rectangular image 1020 generated as a result of the movement of the pixels. The director's view rectangular image 1020 of FIG. 10 is to describe vertical movements of the pixels according to the first embodiment, and FIG. 10 illustrates a vertical movement result under the assumption that only pixels of the director's view projection image 1010, which have pixel data, are moved.

As the director's view projection image 1010 is reshaped into the director's view rectangular image 1020, the amount of data to be processed by the image processing apparatus decreases, but image data within the field of view of the director's view (e.g., 180°×180°) is retained, thus improving the image processing efficiency.

Figure 11:
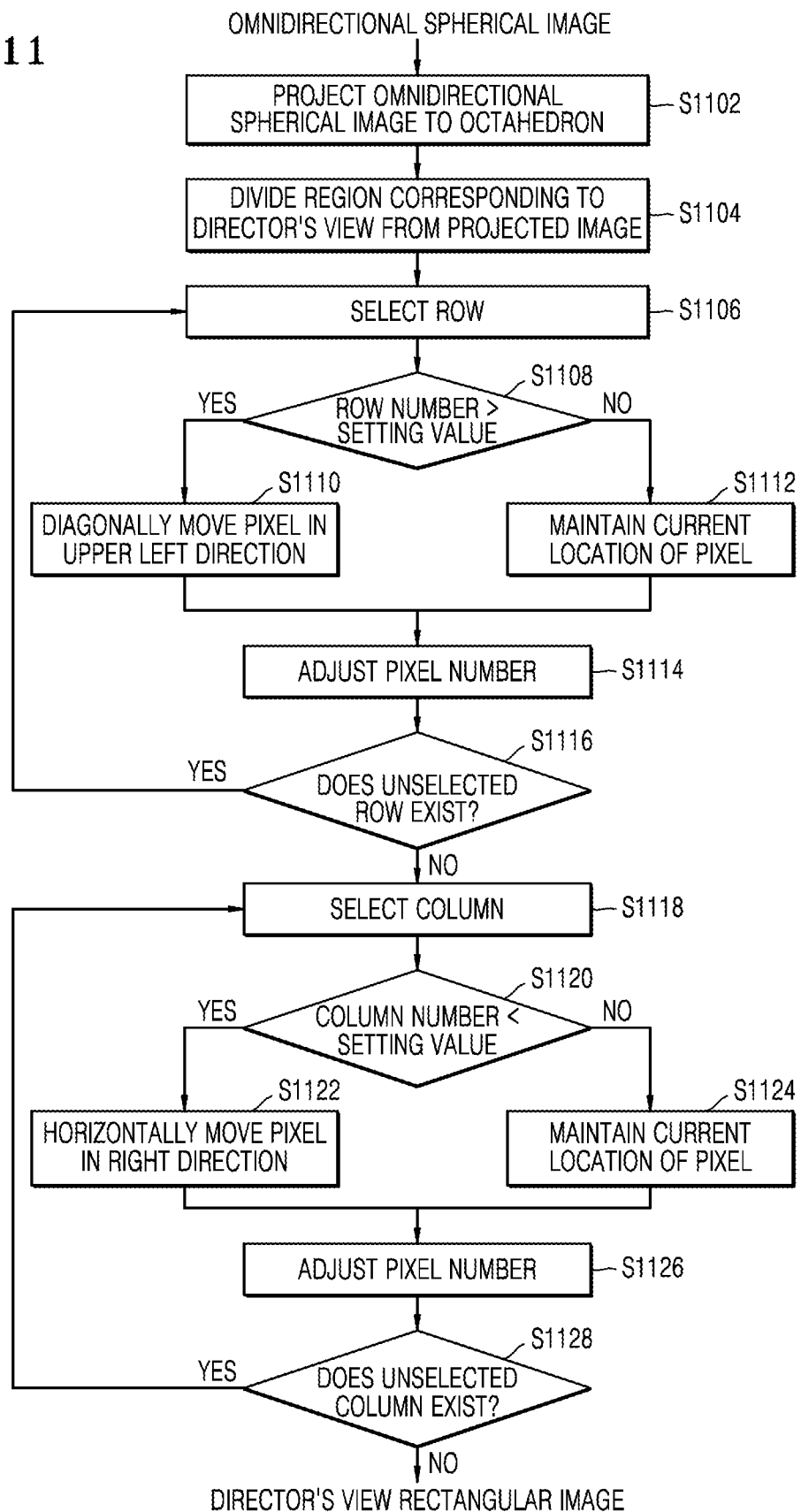
FIG. 11 is a flowchart of a method of reshaping an octahedral projection image into a rectangular image, according to a third embodiment.

FIG. 11 is a flowchart of a method of reshaping an octahedral projection image into a rectangular image, according to a third embodiment.

Referring to FIG. 11, in operation S1102, the image processing apparatus projects the omnidirectional spherical image to the octahedron. The projection image projected to the octahedron may have the same shape as the development view of the projection image 510 of FIG. 5.

When the projection image is obtained in operation S1102, the image processing apparatus divides a region corresponding to the director's view from the projection image in operation S1104. In particular, the image processing apparatus determines a boundary surface of the director's view image and divides the region corresponding to the director's view image from the projection image in a manner of obtaining a region included in the determined boundary surface or removing a region corresponding to an external portion of the boundary surface. A portion corresponding to the divided region is referred to as the director's view projection image 520, and the director's view projection image 520 has an area corresponding to the 180°×180° hemispherical image.

Then, in operation S1106, the image processing apparatus selects one row on the plane on which the director's view projection image 520 is shown. In this case, a row, in which an uppermost pixel of the director's view projection image 520 is located, may be an x axis.

Figure 12:
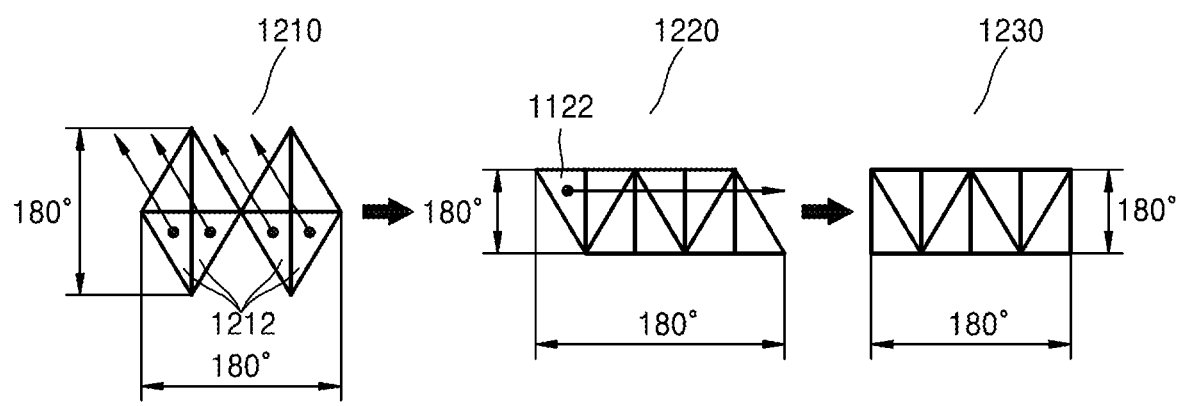
FIG. 12 is a diagram of a process of moving pixels of an octahedral projection image, according to the third embodiment.

In operation S1108, the image processing apparatus determines whether a row number of the selected row is greater than a setting value. FIG. 12 illustrates a director's view projection image 1210 corresponding to the director's view projection image 520 of FIG. 5, and the director's view projection image 1210 has a shape in which triangles are stacked in two layers. According to the third embodiment, the image processing apparatus may set the setting value to be a half of the total number of rows to move the lower triangles in an upper left direction. In this case, the total number of rows corresponds to a vertical length of the director's view projection image 1210. However, this is merely an example, and various standards may be set according to embodiments.

When it is determined that the row number of the selected row is greater than the setting value in operation S1108, the image processing apparatus may proceed with operation S1110 and may diagonally move pixels included in the selected row in upper left direction. When it is determined that the row number of the selected row is less than or equal to the setting value in operation S1108, the image processing apparatus may proceed with operation S1112 and may maintain locations of the pixels included in the selected row.

Then, in operation S1114, the image processing apparatus adjusts numbers (indices) of the pixels.

The image processing apparatus determines whether an unselected row exists in operation S1116, and when an unselected row exists, the image processing apparatus returns to operation S1106 and repeats the above operations.

Operations S1106 and S1116 are processes of reshaping the director's view projection image 1210 of FIG. 12 into a rhombic image 1220 and will be described in detail with reference to FIG. 12.

FIG. 12 is a diagram of a process of moving pixels of an octahedral projection image, according to a third embodiment.

Referring to FIG. 12, the director's view projection image 1210 includes equilateral triangles or right-angled triangles, each of which includes at least one pixel. Also, each pixel included in each triangle of the director's view projection image 1210 has pixel data. A row including an uppermost pixel is called an x axis, and row numbers increase downwards. When the setting value is set to be ½ of a total row length, that is, a height of the director's view projection image 1210, pixels, which are included in rows having row numbers that are greater than ½ of the total row length, may be diagonally moved to the upper left portion.

Therefore, as shown in FIG. 12, the image processing apparatus according to the third embodiment may fill an upper margin of the director's view projection image 1210 by diagonally moving, to the upper left portion, right-angled triangles 1212 including pixels having row numbers which are greater than ½ of the total row length. For example, when a location of a pixel is expressed as $P(x, y)$, Equation $P(x', y')=P(x-¼*w, y-½*h)$ may be used to shift the pixels to the upper left portion. In this case, w indicates a total column length, and h indicates a total row length.

Referring back to FIG. 11, the image processing apparatus determines whether an unselected row exists in operation S1116, and when an unselected row does not exist, the image processing apparatus proceeds with operation S1118 and selects a column on which the rhombic image 1220 is shown. In this case, a row, on which a leftmost pixel of the projection image is located, may be a y axis.

In operation S1120, the image processing apparatus determines whether a column number of the selected column is less than the setting value. Referring to FIG. 12, the image processing apparatus may set the setting value to be ¼ of the total number of columns to horizontally move, in a right direction, a left right-angled triangle 1222 among right-angled triangles forming the rhombic image 1220. In this case, the total number of columns corresponds to a horizontal length of the director's view projection image 1210. However, this is merely an example, and various standards may be set according to embodiments.

When it is determined that the column number of the selected column is less than the setting value in operation S1120, the image processing apparatus may proceed with operation S1122 and may horizontally move pixels included in the selected column to a right portion. When it is determined that the row number of the selected column is greater than or equal to the setting value in operation S1120, the image processing apparatus may proceed with operation S1124 and may maintain locations of the pixels included in the selected column.

Then, in operation S1126, the image processing apparatus adjusts numbers (indices) of the pixels.

The image processing apparatus determines whether an unselected column exists in operation S1128, and when an unselected column exists, the image processing apparatus returns to operation S1118 and repeats the above operations.

Operations S1118 to S1128 are processes of reshaping the rhombic image 1220 of FIG. 12 into a director's view rectangular image 1230 and will be described in detail with reference back to FIG. 12.

Referring to FIG. 12, a column, which includes leftmost pixels of the rhombic image 1210 generated as a result of diagonal movements of the pixels, is called a y axis, and column numbers increase in a right direction. When the setting value is set to be ¼ of the total column length, that is, a width of the director's view projection image 1210, pixels, which are included in columns having column numbers that are less than ¼ of the total column length, may be horizontally moved to the right portion.

Therefore, as shown in FIG. 12, the image processing apparatus according to the third embodiment may fill a right margin of the rhombic image 1220 by horizontally moving, to the right portion, the right-angled triangles 1222 including the pixels having column numbers which are less than ¼ of the total column length. For example, when a location of a pixel is expressed as $P(x, y)$, Equation $P(x', y')=P(x+w, y)$ may be used to shift the pixels to the right portion. In this case, w indicates the total column length.

FIG. 12 illustrates the director's view rectangular image 1230 generated as a result of the movement of the pixels. The director's view rectangular image 1230 of FIG. 12 is to describe diagonal and horizontal movements of the pixels according to the third embodiment and FIG. 12 illustrates diagonal and horizontal movement results under the assumption that only pixels of the director's view projection image 1210, which have pixel data, are moved.

As the director's view projection image 1210 is reshaped into the director's view rectangular image 1230, the amount of data to be processed by the image processing apparatus decreases, but image data within a field of view of the director's view (e.g., 180°×180°) is retained, thus improving the image processing efficiency.

Figure 13:
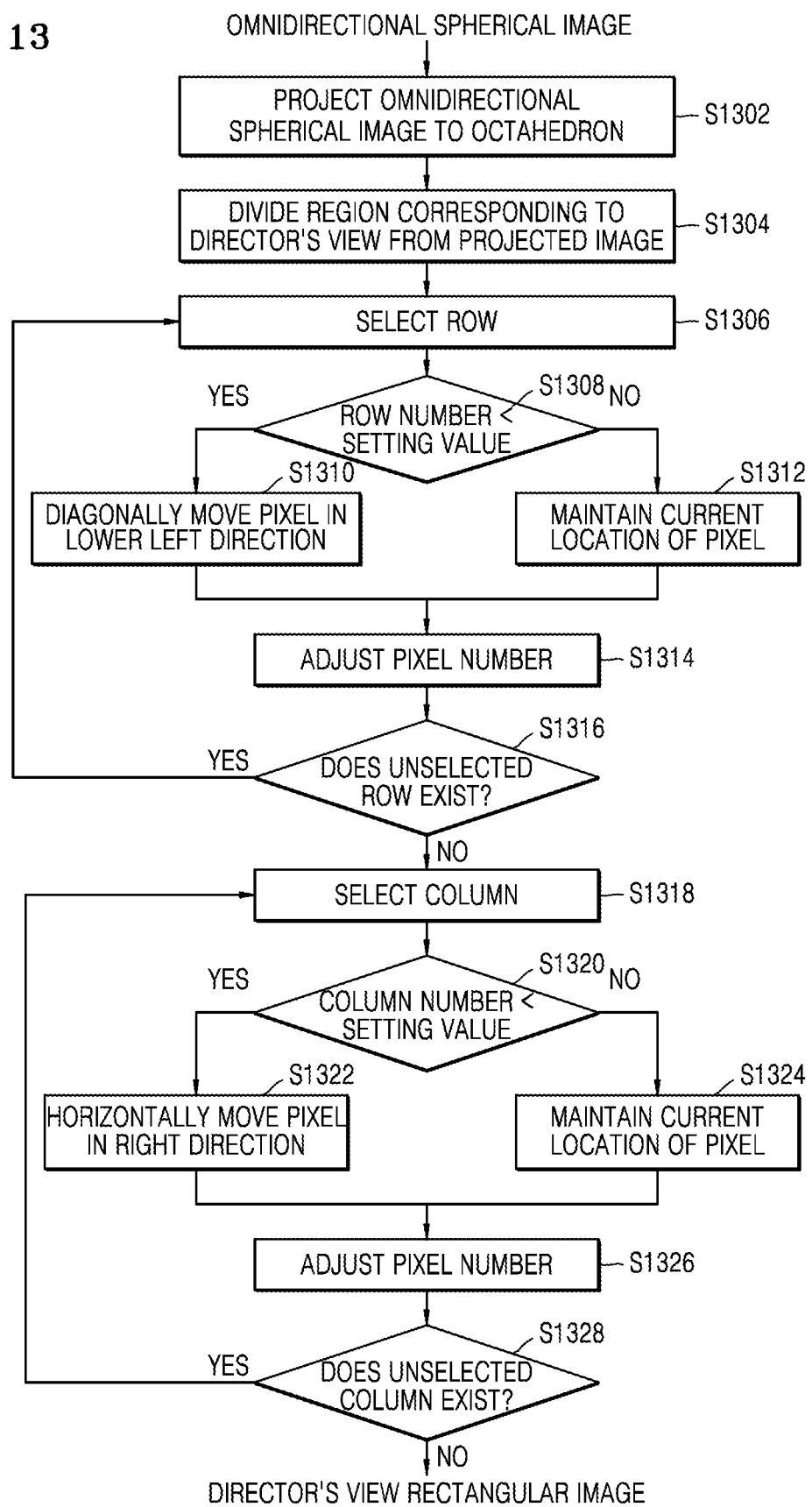
FIG. 13 is a flowchart of a method of reshaping an octahedral projection image into a rectangular image, according to a fourth embodiment.

FIG. 13 is a flowchart of a method of reshaping an octahedral projection image into a rectangular image, according to a fourth embodiment.

Referring to FIG. 13, in operation S1302, the image processing apparatus projects the omnidirectional spherical image to the octahedron. The projection image projected to the octahedron has the same shape as the development view of the projection image 510 of FIG. 5.

When the projection image is obtained in operation S1302, the image processing apparatus divides a region corresponding to the director's view from the projection image in operation S1304. In particular, the image processing apparatus determines a boundary surface of the director's view image and divides the region corresponding to the director's view image from the projection image in a manner of obtaining a region included in the determined boundary surface or removing a region corresponding to an external portion of the boundary surface. A portion corresponding to the divided region is referred to as the director's view projection image 520, and the director's view projection image 520 has an area corresponding to a 180°×180° hemispherical image.

Then, in operation S1306, the image processing apparatus selects one row on the plane on which the director's view projection image 520 is shown. In this case, a row, in which an uppermost pixel of the director's view projection image 520 is located, may be an x axis.

Figure 14:
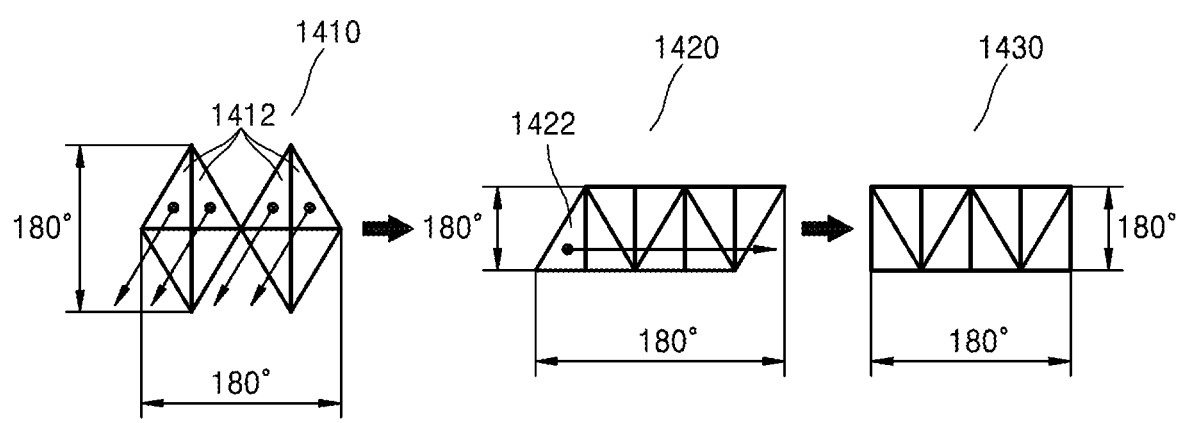
FIG. 14 is a diagram of a process of moving pixels of an octahedral projection image, according to the fourth embodiment.

In operation S1308, the image processing apparatus determines whether a row number of the selected row is less than a setting value. FIG. 14 illustrates a director's view projection image 1410 corresponding to the director's view projection image 520 of FIG. 5, and the director's view projection image 1410 has a shape in which triangles are stacked in two layers. According to the fourth embodiment, the image processing apparatus may set the setting value to be ½ of the total number of rows to move upper triangles in a lower left direction. In this case, the total number of rows corresponds to a vertical length of the director's view projection image 1410. However, this is merely an example, and various standards may be set according to embodiments.

When it is determined that the row number of the selected row is less than the setting value in operation S1308, the image processing apparatus may proceed with operation S1310 and may diagonally move pixels included in the selected row to a lower left portion. When it is determined that the row number of the selected row is greater than the setting value in operation S1308, the image processing apparatus may proceed with operation S1312 and may maintain locations of the pixels included in the selected row.

Then, in operation S1314, the image processing apparatus adjusts numbers (indices) of the pixels.

The image processing apparatus determines whether an unselected row exists in operation S1316, and when an unselected row exists, the image processing apparatus returns to operation S1306 and repeats the above operations.

Operations S1306 to S1316 processes of reshaping the director's view projection image 1410 of FIG. 14 into a rhombic image 1420 and will be described in detail with reference to FIG. 14.

FIG. 14 is a diagram of a process of moving pixels of an octahedral projection image, according to the fourth embodiment.

Referring to FIG. 14, the director's view projection image 1410 according to an embodiment includes equilateral triangles or right-angled triangles, each of which includes at least one pixel. Also, each pixel included in each triangle of the director's view projection image 1410 has pixel data. A row including an uppermost pixel is called an x axis, and row numbers increase downwards. When the setting value is set to be ½ of the total row length, that is, a height of the director's view projection image 1410, pixels, which are included in rows having row numbers that are less than ½ of the total row length, may be diagonally moved to the lower left portion.

Therefore, as shown in FIG. 14, the image processing apparatus according to the fourth embodiment may fill a lower margin of the director's view projection image 1410 by diagonally moving, to the lower left portion, right-angled triangles 1412 including pixels having row numbers which are less than ½ of the total row length. For example, when a location of a pixel is expressed as P(x', y'), Equation P(x, y)=P(x−¼*w, y+½*h) may be used to shift the pixels to the lower left portion. In this case, w indicates the total column length, and h indicates the total row length.

Referring back to FIG. 13, the image processing apparatus determines whether an unselected row exists in operation S1316, and when an unselected row does not exist, the image processing apparatus proceeds with operation S1318 and selects a column on the plane on which the rhombic image 1420 is shown. In this case, a row including a leftmost pixel of the projection image may be a y axis.

In operation S1320, the image processing apparatus determines whether a column number of the selected column is less than the setting value. Referring to FIG. 14, the image processing apparatus may set the setting value to be ¼ of the total number of columns to horizontally move, in a right direction, left right-angled triangles 1422 among the right-angled triangles forming the rhombic image 1420. In this case, the total number of columns corresponds to a horizontal length of the director's view projection image 1410. However, this is merely an example, and various standards may be set according to embodiments.

When it is determined that the column number of the selected column is less than the setting value in operation S1320, the image processing apparatus may proceed with operation S1322 and may horizontally move pixels included in the selected column to the right portion. When it is determined that the row number of the selected column is greater than or equal to the setting value in operation S1320, the image processing apparatus may proceed with operation S1324 and may maintain locations of the pixels included in the selected column.

Then, in operation S1326, the image processing apparatus adjusts numbers (indices) of the pixels.

The image processing apparatus determines whether an unselected column exists in operation S1328, and when an unselected column exists, the image processing apparatus returns to operation S1318 and repeats the above operations.

Operations S1318 to S1328 are processes of reshaping the rhombic image 1420 of FIG. 14 into a director's view rectangular image 1430 and will be described in detail with reference back to FIG. 14.

Referring to FIG. 14, a column, which includes leftmost pixels of the rhombic image 1420 generated as a result of diagonal movements of the pixels, is called a y axis, and column numbers increase in a right direction. When the setting value is set to be ¼ of the total column length, that is, a width of the director's view projection image 1410, pixels, which are included in columns having column numbers that are less than ¼ of the total column length, may be horizontally moved to the right portion.

Therefore, as shown in FIG. 14, the image processing apparatus according to the fourth embodiment may fill a right margin of the rhombic image 1420 by horizontally moving, to the right portion, the right-angled triangles 1422 including the pixels having column numbers which are less than ¼ of the total column length. For example, when a location of a pixel is expressed as P(x, y), Equation P(x', y')=P(x+w, y) may be used to shift the pixels to the right portion. In this case, w indicates the total column length.

FIG. 14 illustrates the director's view rectangular image 1430 generated as a result of the movements of the pixels. The director's view rectangular image 1430 of FIG. 14 is to describe diagonal and horizontal movements of the pixels according to the fourth embodiment, and FIG. 14 illustrates the diagonal and horizontal movement results under the assumption that only pixels of the director's view projection image 1410, which have pixel data, are moved.

As the director's view projection image 1410 is reshaped into the director's view rectangular image 1430, the amount of data to be processed by the image processing apparatus decreases, but image data within a field of view of the director's view (e.g., 180°×180°) is retained, thus improving the image processing efficiency.

As described above, the image processing apparatus may reshape an icosahedral projection image or an octahedral projection image into a rectangular image according to various embodiments. However, the above embodiments may be realized in many different forms, and the disclosure is not limited thereto. For example, reshaping may be performed as shown in FIG. 15.

Figure 15:
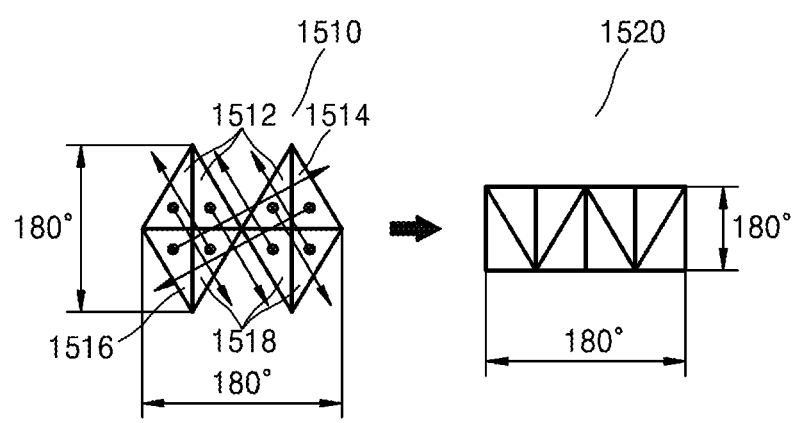
FIG. 15 is a diagram of a process of moving pixels of an octahedral projection image, according to one or more embodiments.

FIG. 15 is a diagram of a process of moving pixels of an octahedral projection image, according to one or more embodiments.

Referring to FIG. 15, a director's view projection image 1510 according to an embodiment may be reshaped into a director's view rectangular image 1520 by only diagonally moving pixels.

For example, the image processing apparatus may diagonally move, to a lower right portion, pixels corresponding to a right-angled triangle region 1512 from among pixels included in rows which have row numbers that are less than ½ of a height of the director's view projection image 1510, and may move, to a lower left portion, pixels corresponding to a right-angled triangle region 1514.

As another example, the image processing apparatus may diagonally move, to an upper right portion, pixels corresponding to a right-angled triangle region 1516 from among pixels included in rows which have row numbers that are greater than ½ of the height of the director's view projection image 1510, and may move, to an upper left portion, pixels corresponding to a right-angled triangle region 1518.

A method of moving the pixels according to an embodiment may be applied in various manners. For example, an order of the horizontal movement, the vertical movement, and the diagonal movement may be complexly applied.

According to an embodiment, as a projection image is reshaped into a rectangular image, the amount of unnecessary data to be processed by the image processing apparatus may decrease. Also, pixels adjacent to the reshaped rectangular image are highly likely to have consecutive pieces of data, and thus efficient processing is available.

The above-described methods of reshaping rectangular images are merely examples, and rectangular images may be reshaped by using various methods. For example, the above-described methods of moving locations of the pixels may be complexly used to reshape the rectangular images. Also, other methods of moving locations of pixels may be used to reshape the rectangular images.

Figure 16:
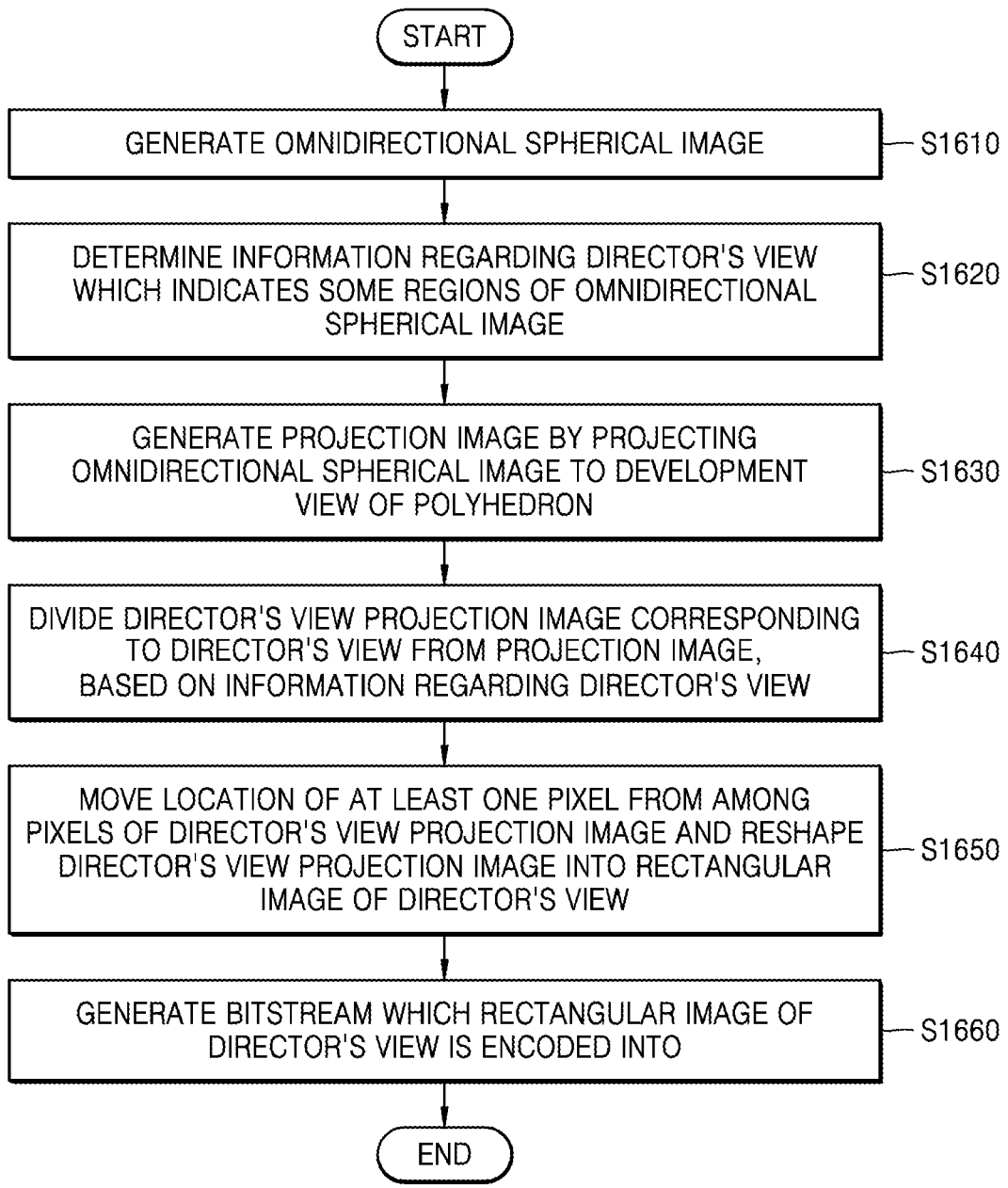
FIG. 16 is a flowchart of an image processing method according to an embodiment.

FIG. 16 is a flowchart of an image processing method, according to an embodiment.

Referring to FIG. 16, in operation S1610, the image processing apparatus generates an omnidirectional spherical image. The image processing apparatus may capture an ambient environment surrounding the image processing apparatus by using a camera and may obtain images in at least two directions.

In operation S1620, the image processing apparatus determines information regarding a director's view indicating some regions of the omnidirectional spherical image. The director's view indicates a region sub-divided from image content. That is, when a field of view of the omnidirectional spherical image is 360°×180°, a field of view of the director's view may become narrower than that of the omnidirectional spherical image and thus may be less than 360°× 180°. For example, the field of view of the director's view may be hemispherical (180°×180°). As described above with reference to FIG. 2, the information regarding the director's view may be determined by the content provider or the user or may be automatically determined through image analysis when images are processed.

In operation S1630, the image processing apparatus generates a projection image by projecting the omnidirectional spherical image to the development view of the polyhedron. Specific processes of generating a projection image are described above with reference to FIG. 3.

In operation S1640, the image processing apparatus divides a director's view projection image corresponding to the director's view from the projection image, based on the information regarding the director's view. Specific processes of dividing the director's view projection image are described above with reference to FIGS. 4 and 5.

In operation S1650, the image processing apparatus moves a location of at least one pixel from among pixels of the director's view projection image and reshapes the director's view projection image into the rectangular image. A margin, which is produced while a 3D polyhedron is developed as a 2D projection image, is unnecessary data requiring image processing, and the process of reshaping the projection image into the rectangular image is a process of reducing unnecessary data, which needs to be processed by the image processing apparatus, by reducing such a margin. Specific processes of reshaping the director's view projection image into the director's view rectangular image are described above with reference to FIGS. 7 to 15.

In operation S1660, the image processing apparatus generates a bitstream which the director's view rectangular image is encoded into. Although not shown in FIG. 16, according to an embodiment, the image processing method may further include generating reconstruction information necessary to reconstruct the reshaped rectangular image into the projection image. According to an embodiment, the reconstruction information may include information regarding a director's view, information regarding a 3D model used when an image is projected, and information regarding a history of moving a location of a pixel and/or an original location of a pixel. The reconstruction information according to an embodiment may be included in SEI parameters of the NAL unit within a bitstream. As described above, when the history of moving the location of the pixel and/or the original location of the pixel is acquired, the rectangular image may be easily reconstructed as the projection image. Also, according to an embodiment, the image processing apparatus may further include transmitting the reconstruction information and the reshaped rectangular image. As the image processing apparatus transmits reconstruction information and the reshaped rectangular image together, a device receiving the same may easily reconstruct the reshaped rectangular image as the projection image.

Although not shown in FIG. 16, the image processing method according to an embodiment may further include processing the image corresponding to the director's view as well as the omnidirectional spherical image. According to an embodiment, by using the image processing method, the region corresponding to the director's view may not be divided from the projection image, but may be reshaped into the rectangular image of the omnidirectional spherical image. To reshape the projection image according to an embodiment into the rectangular image of the omnidirectional spherical image, the reshaping method described with reference to FIGS. 7 to 15 may be identically applied. The image processing method according to an embodiment may include generating a bitstream by encoding the rectangular image of the reshaped omnidirectional spherical image. According to the image processing method according to an embodiment, the omnidirectional spherical image and the director's view image are simultaneously projected, reshaped, encoded, and stored (e.g., stored in a server), and thus, the device receiving the same may select whether to reproduce an image in a full mode or a director's view mode.

The image processing method according to an embodiment has been described. Hereinafter, the image processing apparatus of performing the image processing method according to an embodiment will be described with reference to FIG. 17.

Figure 17:
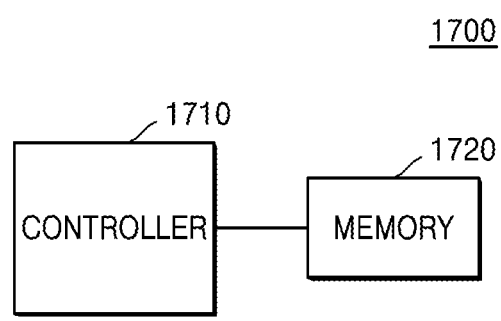
FIG. 17 is a block diagram of an image processing apparatus according to an embodiment.

FIG. 17 is a block diagram of an image processing apparatus, according to an embodiment.

Referring to FIG. 17, an image processing apparatus 1700 includes a controller 1710 and a memory 1720.

The controller 1710 may control all operations of the image processing apparatus 1700 and control the memory 1720, thereby processing an image. The controller 1710 may include a processor and ROM that stores therein a control program for controlling RAM and peripheral devices used to store signals or data input from the outside or used as storage corresponding to various jobs performed by an electronic apparatus. The processor may be embodied as a System on Chip (SoC) in which a core and a graphic processing unit (GPU) are integrated. Also, the processor may include multiple processors.

The controller 1710 according to an embodiment may obtain images in at least two directions, generate a projection image by projecting the images to a development view of the polyhedron, divides a region corresponding to a director's view from pixels of the projection image, and reshape the projection image into a rectangular image by moving a location of at least one pixel.

The controller 1710 according to an embodiment may perform the image processing method described with reference to FIGS. 1 to 16. Here, repeated descriptions will be briefly provided.

When images are projected to a polyhedron to generate a projection image, the controller 1710 according to an embodiment may project the images to regions of a development view that correspond to regions of the polyhedron to which the images are projected.

When the projection image is reshaped into the rectangular image, the controller 170 according to an embodiment may generate the rectangular image by only moving the location of the pixels without deleting the pixels or adding new pixels.

The controller 170 according to an embodiment may generate the reconstruction information necessary to reconstruct the rectangular image into the projection image.

The controller 1710 according to an embodiment may control the reshaped rectangular image and the reconstruction information to be transmitted.

According to an embodiment, the controller 1710 may reduce unnecessary data to be processed by the image processing apparatus by reshaping the projection image into the rectangular image.

The memory 1720 may store data and programs necessary to operate the image processing apparatus 1700. The memory 1720 may include a volatile storage medium, a nonvolatile storage medium, or a combination thereof. Examples of the volatile storage medium include semiconductor memories such as RAM, DRAM, and SRAM, and examples of the nonvolatile storage medium may include hard disks, and flash NAND memory.

The memory 1720 according to an embodiment may store data used to operate the controller 1710.

Furthermore, although not shown in FIG. 17, the image processing apparatus 1700 may further include a camera, a receiver, a transmitter, and the like. According to an embodiment, the camera may capture an ambient environment surrounding the image processing apparatus at 360 degrees by using the camera. Also, the receiver may receive a 360° image from an external device. According to an embodiment, the transmitter may transmit the reshaped rectangular image and reconstruction information. The receiver and the transmitter may each include a communicator.

The image processing apparatus 1700 according to an embodiment may reduce the amount of data to be processed, may decrease the amount of power consumed to process data by processing the image to make adjacent pixels have consecutive pieces of data, and may improve the processing efficiency.

Figure 18:
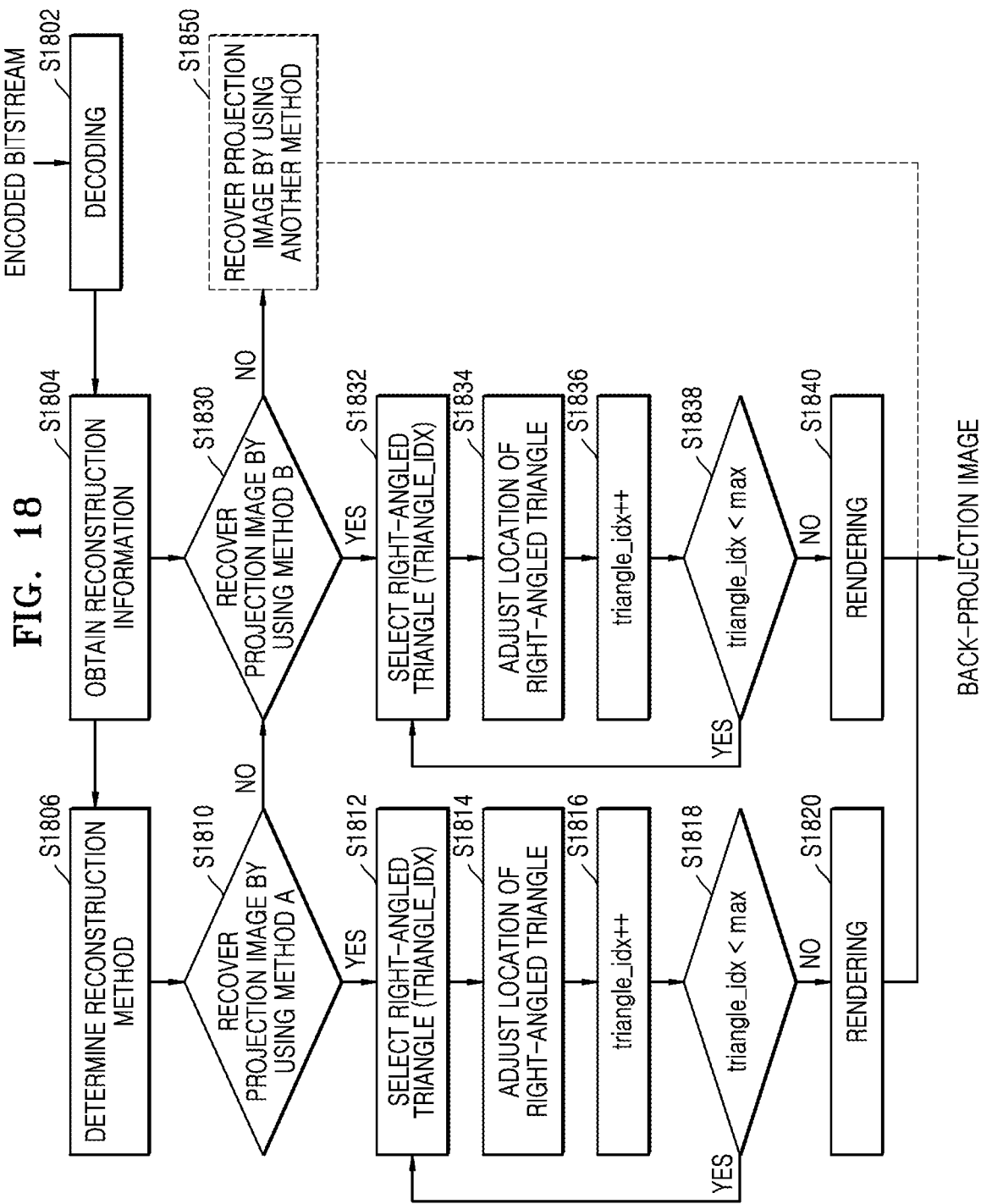
FIG. 18 is a flowchart of a method of generating a back-projection image by decoding an image from a bitstream, according to an embodiment.

FIG. 18 is a flowchart of a method of generating a back-projection image by decoding an image from a bitstream, according to an embodiment.

Referring to FIG. 18, in operation S1802, the image processing apparatus receives an encoded bitstream and performs decoding thereon. According to an embodiment, in operation S1802, the image processing apparatus may perform decoding according to international standards (e.g., MPEG of ISO/IEC), H.26x of ITU-T, etc.) related to video compression and may obtain decoded images. In this case, the decoded images are rectangular images generated as a projection image (or a projection image of a director's view) is reshaped.

In operation S1804, the image processing apparatus obtains reconstruction information from a bitstream. The reconstruction information according to an embodiment may include information regarding the director's view, information regarding a 3D model (polyhedron information) used during the image projection, information (reshaping information) regarding a history of moving a location of a pixel, and/or an original location of the pixel. The image processing apparatus according to an embodiment may obtain the reconstruction information from SEI parameters of a NAL unit within a bitstream.

In operation S1806, the image processing apparatus uses the reconstruction information and determines a method of recovering the reshaped rectangular image as the projection image. That is, the image processing apparatus may determine one reconstruction method from among one or more reconstruction methods. As described above with reference to FIGS. 7 to 15, the projection image (or the projection image of the director's view) may be reshaped into the rectangular image according to various embodiments. According to an embodiment, since the reconstruction information includes information regarding a history of moving a location of a pixel at a point in time when reshaping is performed, and/or information regarding an original location of a pixel, the rectangular image may be reconstructed as the projection image based on the information.

The reconstruction methods may differ depending on which polyhedron is used by the projection image. Therefore, in operation S1806, the image processing apparatus may determine a reconstruction method based on the information regarding the 3D model (a polyhedron) used during the image projection. Also, the image processing apparatus may initialize a 3D module before reconstruction is performed by using each method.

When the image processing apparatus determines the reconstruction method as a method A in operation S1806, the image processing apparatus proceeds with operation S1810 and reconstructs the projection image by using the method A, and when the image processing apparatus determines the reconstruction method as a method B, the image processing apparatus proceeds with operation S1830 and reconstructs the projection image by using the method B, and when another method is determined as the reconstruction method, the image processing apparatus proceeds with operation S1850 and reconstructs the projection image by using the determined method. Here, the methods A and B and another method are used to classify respective methods for convenience and do not refer to certain reconstruction methods.

A specific reconstruction method using the method A will be described. Processes of recovering the rectangular image as the projection image are performed reversely to processes of reshaping the projection image into the rectangular image and thus will be briefly described.

In operation S1812, the image processing apparatus selects a comparted right-angled triangle as a basic unit for moving pixels of the rectangular image. Respective right-angled triangles are indexed, and indices of the right-angled triangles may be included in the reconstruction information.

In operation S1814, the image processing apparatus adjusts a location of the selected right-angled triangle. The image processing apparatus according to an embodiment may move the pixels to an image (i.e., the projection image), which is shown before reshaping into the rectangular image is performed, based on the information regarding the history of moving the location of the pixel and/or the original location of the pixel. The image processing apparatus according to an embodiment may move pixels of the right-angled triangle in an order that is opposite the reshaping order described with reference to FIGS. 7 to 15. For example, when a reshaping order according to the method A is horizontal movements of the pixels after diagonal movements thereof, a reconstruction order according to the method A may be diagonal movements of the pixels after horizontal movements thereof.

When the location of the right-angled triangle is adjusted in operation S1814, a next right-angled triangle is selected in operation S1816.

The image processing apparatus determines whether an unselected right-angled triangle exists in operation S1818, and when an unselected right-angled triangle exists, the image processing apparatus returns to operation S1812 and repeats the above operations.

When the image processing apparatus determines that adjustments to locations of all right-angled triangles are completed in operation S1818, the reconstruction of the projection image is completed, and then operation S1820 is performed.

In operation S1820, the image processing apparatus performs rendering on the projection image generated through the previous processes. In operation S1820, the image processing apparatus assembles the projection image as a polyhedron and generates a back-projection image by performing back-projection on the polyhedron. In this case, the back-projection image may be an image showing an ambient environment surrounding a certain location. According to an embodiment, the image processing apparatus may generate an image showing the entire ambient environment or some of the ambient environment surrounding the certain location. In this case, when an image mode is a full mode, an omnidirectional spherical image may be generated, and when the image mode is a director's view mode, a director's view image (e.g., a 180°×180° hemispherical image) may be generated. Also, when the image processing apparatus is a VR apparatus and the user uses the VR apparatus, a back-projection image showing an ambient environment around the user may be generated according to a user's gaze. In this case, the generated back-projection image may be an image showing not the entire ambient environment of the user but a part of the ambient environment, which is displayed according to the user's gaze.

Referring to FIG. 18, even when the image processing apparatus according to an embodiment determines to reconstruct the rectangular image by using the method B, processes that are identical to those using the method A may be performed. That is, operations S1832, S1834, S1836, S1838, and S1840 respectively correspond to operations S1812, S1814, S1816, S1818, and S1820.

The method of generating the back-projection image according to the embodiment described with reference to FIG. 18 is merely an example, and depending on a method of reshaping a rectangular image, various methods may be used.

Figure 19:
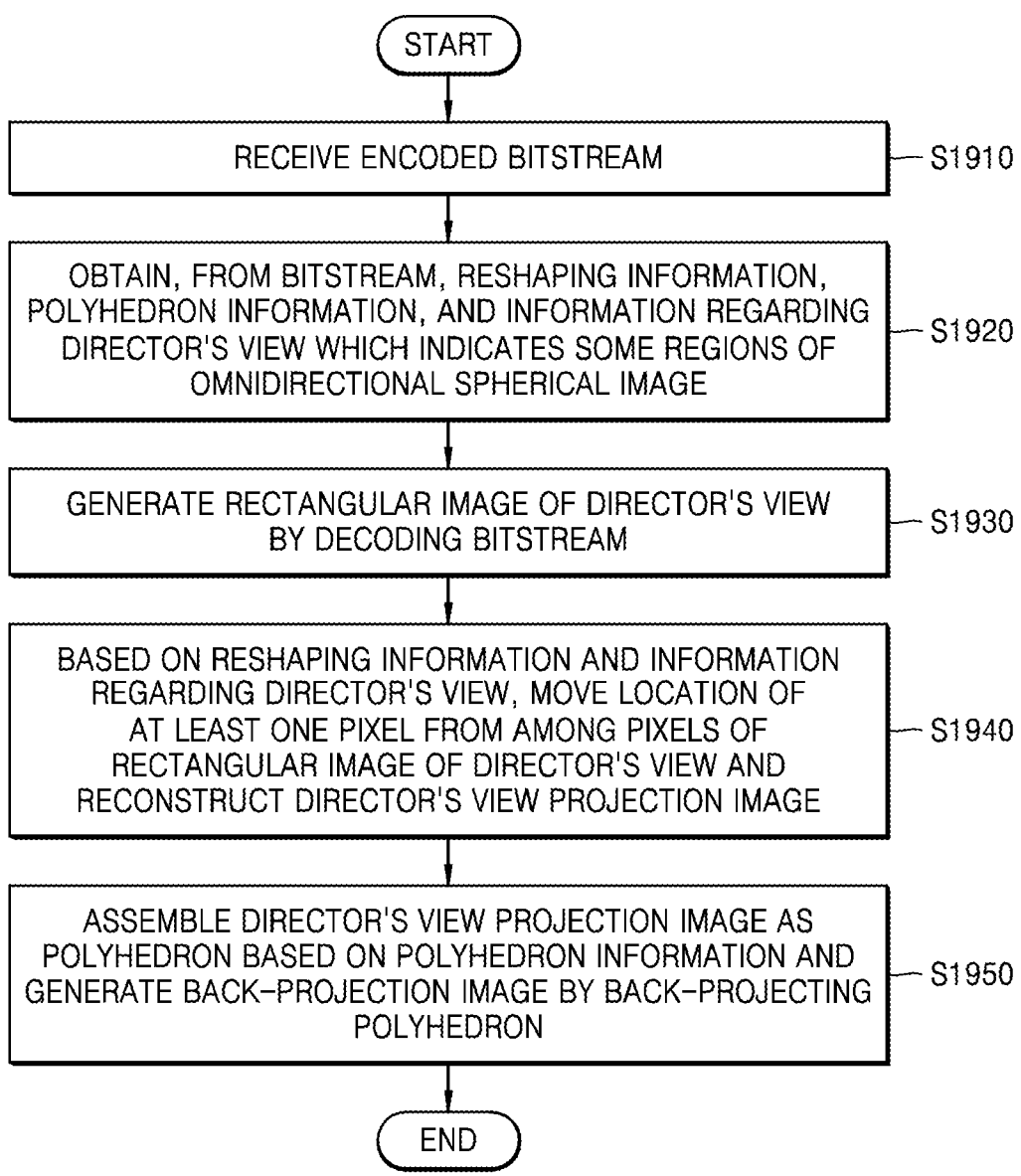
FIG. 19 is a flowchart of an image processing method according to another embodiment.

FIG. 19 is a flowchart of an image processing method, according to another embodiment.

Referring to FIG. 19, in operation S1910, the image processing apparatus receives an encoded bitstream.

In operation S1920, the image processing apparatus obtains, from a bitstream, the reshaping information, the polyhedron information, and the information regarding the director's view which indicates some regions of the omnidirectional spherical image. The reshaping information, the polyhedron information, and the information regarding the director's view which indicates some regions of the omnidirectional spherical image may be obtained from the SEI parameters of the NAL unit within a bitstream and may correspond to the above-described reconstruction information.

In operation S1930, the image processing apparatus decodes a bitstream and generates the rectangular image of the director's view.

In operation S1940, based on the reconstruction information and the information regarding the director's view, the image processing apparatus reconstructs the director's view projection image by moving a location of at least one of the pixels of the rectangular image of the director's view. In operation S1940, the specific processes in which the image processing apparatus reconstructs the director's view projection image are the same as operations S1812 to S1818 of FIG. 18.

In operation S1950, based on the polyhedron information, the image processing apparatus assembles the director's view projection image as a polyhedron and back-projects the polyhedron, thereby generating the back-projection image. In operation S1950, the process in which the image processing apparatus generates the back-projection image is the same as operation S1820 of FIG. 18.

Although not shown in FIG. 19, the image processing method according to another embodiment may further include receiving information regarding an image mode which indicates whether to reproduce an image in a full mode or a director's view mode. According to the image processing method according to another embodiment, when the information regarding the image mode indicates the full mode, the rectangular image of the omnidirectional spherical image may be generated by decoding a bitstream, the projection image of the omnidirectional spherical image may be reconstructed by moving the location of the at least one pixel from among the pixels of the rectangular image of the omnidirectional spherical image, and the omnidirectional spherical image may be generated by back-projecting the projection image of the omnidirectional spherical image. Also, according to the image processing method according to another embodiment, when the information regarding the image mode indicates the director's view mode, the director's view projection image is back-projected, and an image according to the director's view may be generated.

Figure 20:
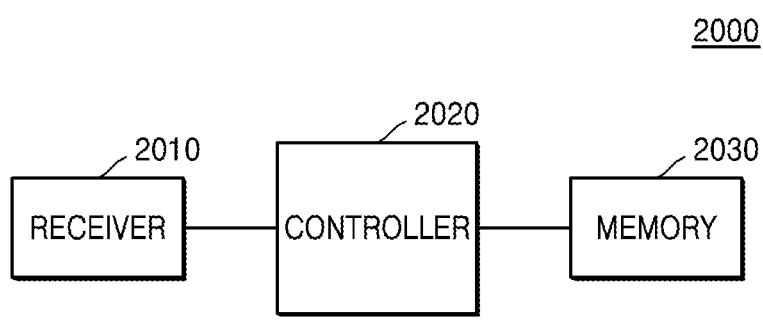
FIG. 20 is a block diagram of an image processing apparatus according to another embodiment.

FIG. 20 is a block diagram of an image processing apparatus, according to another embodiment.

Referring to FIG. 20, an image processing apparatus 2000 includes a receiver 2010, a controller 2020, and a memory 2030. According to another embodiment, the image processing apparatus 2000 may be a VR apparatus.

The receiver 2010 receives an encoded bitstream. In this case, the encoded bitstream may include data regarding a rectangular image. Also, reconstruction information may be included in SEI parameters of an NAL unit of the encoded bitstream. The receiver 2010 may include various components such as a USB interface and a DVD interface unit. For example, when the receiver 2010 includes the USB interface unit, the image processing apparatus 2000 may receive image files from a USB. Furthermore, when the image is received from the external device through a communicator (not shown), the communicator may function as the receiver 2010. In this case, the communicator may communicate with the external device via a wired or wireless network and may include a near field communication module, a mobile communication module, a wireless Internet module, a wired Internet module, and the like. Also, the communicator may include one or more components.

The memory 2030 may store programs and data necessary to operate the image processing apparatus 2000. The memory 2030 may be a volatile storage medium, a nonvolatile storage medium, or a combination thereof. Examples of the volatile storage medium include semiconductor memories such as RAM, DRAM, and SRAM, and examples of the nonvolatile storage medium may include hard disks, and flash NAND memory.

The memory 2030 according to another embodiment may store data used to operate the controller 2020.

The controller 2020 may control all operations of the image processing apparatus 2000 and may process the image by controlling the memory 2030. The controller 2020 may include ROM and a processor that stores therein a control program for controlling RAM and peripheral devices used to store signals or data input from the outside or used as storage corresponding to various jobs performed by an electronic apparatus. The processor may be embodied as an SoC in which a core and a GPU are integrated. Also, the processor may include processors.

The controller 2020 according to another embodiment may obtain a rectangular image, reconstruct a projection image by moving a location of at least one of pixels included in the rectangular image, assemble the projection image as a polyhedron, and generate a back-projection image by back-projecting the polyhedron.

The controller 2020 according to another embodiment may perform the image processing method described with reference to FIG. 19. Therefore, repeated descriptions will be omitted.

When the back-projection image is generated based on the rectangular image, the image processing apparatus 2000 according to another embodiment reconstructs a small amount of data and thus may efficiently perform processing with low power.

Figure 21:
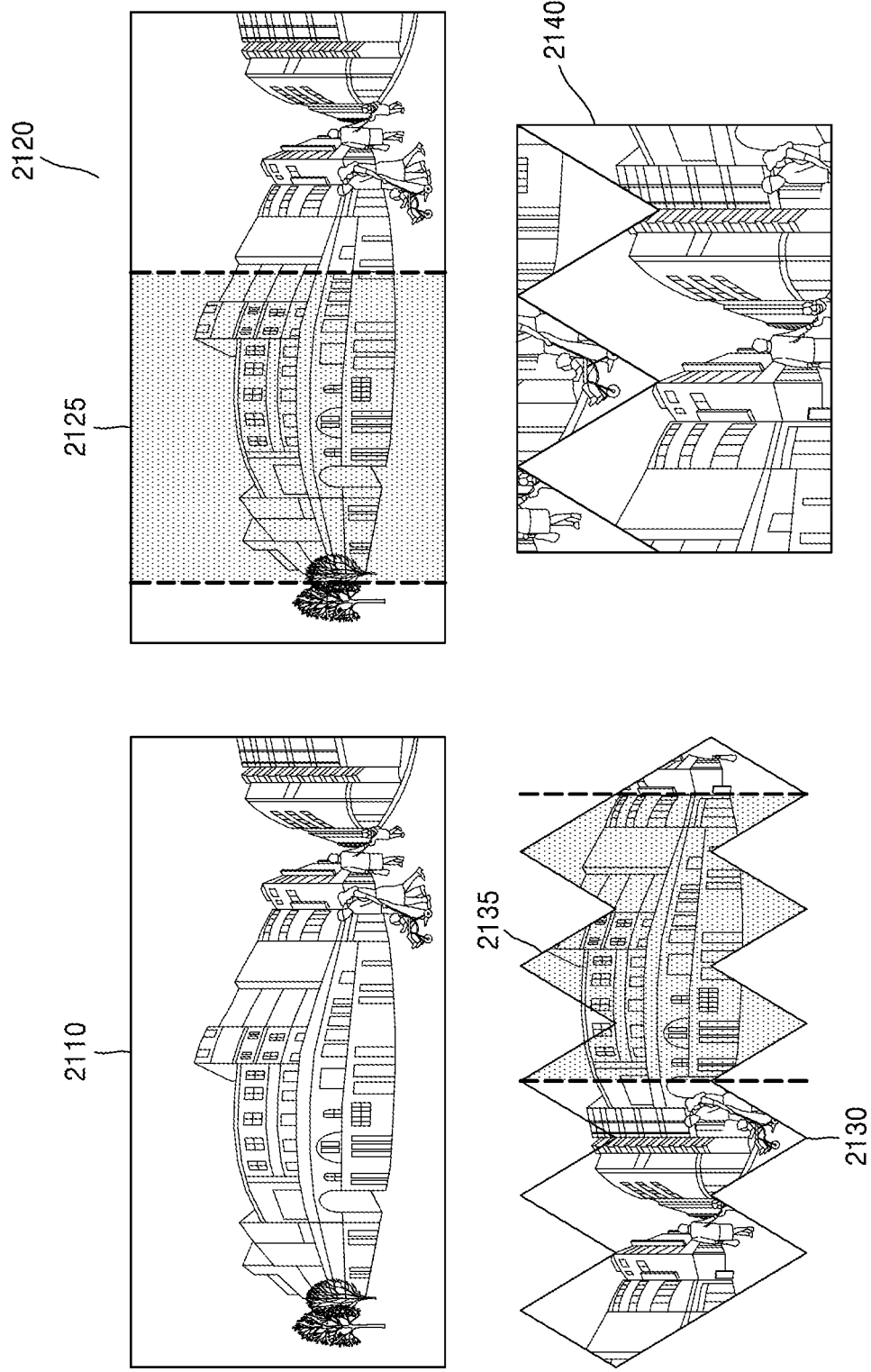
FIG. 21 illustrates an actual rectangular image that is reshaped, according to an embodiment.

FIG. 21 illustrates an actual rectangular image that is reshaped, according to an embodiment.

FIG. 21 illustrates ERP projection images 2110 and 2120 and polyhedral projection images 2130 and 2140 for comparison of sizes and shapes.

Referring to FIG. 21, the image 2110 is an ERP projection image to which an omnidirectional spherical image is projected in an equi-rectangular direction. Also, the image 2120 shows that a region 2125 of the ERP projection image is removed, the region 2125 not being included in the director's view.

The image 2130 of FIG. 21 is an icosahedral projection image generated by projecting the omnidirectional spherical image to the icosahedron. Also, the image 2140 is produced by removing a region 2135 of the image 2130, which is not included in the director's view, and then reshaping remaining regions into a rectangle.

Referring to FIG. 21, the ERP projection images 2110 and 2120 have greater areas to be processed, compared to the polyhedral projection images 2130 and 2140 and require a greater amount of operations due to nonlinear characteristics by which an area to be processed differs according to a location in an image. On the contrary, since the polyhedral projection images 2130 and 2140 use polyhedrons having the same shapes and areas, a 3D space image may be easily converted into a 2D plane image.

Also, referring to FIG. 21, the polyhedral projection images 2130 and the image 2140 having a rectangular shape each have a shape in which triangles are stacked in three layers, which are identical to the shape of the projection image 310 of FIG. 4.

In addition, referring to FIG. 21, as described above with reference to FIG. 8, there exists a discontinuous boundary surface, which is generated due to the movements of the pixels, in the image 2140 being reshaped into the rectangle.

FIG. 22 illustrates parameters indicating information regarding a director's view, according to an embodiment.

FIG. 22 illustrates various parameters. The parameters are SEI parameters of the NAL unit, and due to the parameters, a direction and a size of the director's view may be specified. For example, "vps_offset_rotation", "vps_yaw_clip_flag", and "vps_pitch_clip_flag" are flags indicating whether to process some regions of the omnidirectional spherical image. When "vps_offset_rotation" indicates '1', "yaw_center", "pitch_center", and "roll_center", which respectively indicate a center, a width, and a height of a director's view region, are obtained, and when "vps_offset_rotation" indicates '0', it means that a director's view mode is not used. Also, when "vps_yaw_clip_flag" indicates '1', "yaw_range", which is information indicating a range limiting a vertical length of a processed image, is obtained, and when "vps_yaw_clip_flag" indicates '0', it means that the vertical length of the image is not limited. Also, when "vps_pitch_clip_flag" indicates '1', "pitch_range", which is information indicating a range limiting a horizontal length of the processed image, is obtained, and when "vps_pitch_clip_flag" indicates '0', it means that the horizontal length of the image is not limited.

Figure 23:
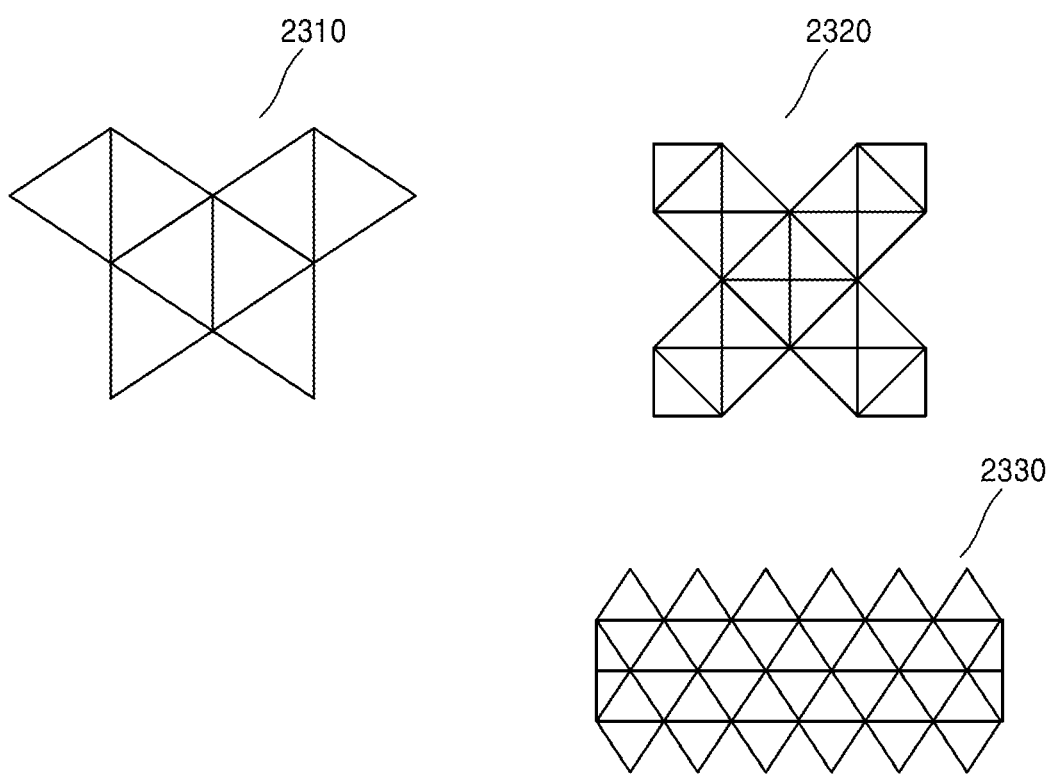
FIG. 23 illustrates projection images according to an embodiment.

FIG. 23 illustrates projection images, according to an embodiment.

The use of an icosahedron or an octahedron as a polyhedron for projecting the image has been exemplified to describe the image processing processes. However, as described above, the polyhedron is not limited to the icosahedron or the octahedron, and image processing may be performed by projecting images to polyhedrons of various shapes. FIG. 23 illustrates projection images using polyhedrons of various shapes.

FIG. 23 illustrates a projection image 2310 using an octahedron, a projection image 2320 using a hexahedron, and a projection image 2330 using a octadecahedron. Referring to FIG. 23, such polyhedrons may be polyhedrons including at least one triangle having the same shape and area. In this case, one surface of the polyhedron may include a polygon including at least two triangles. According to an embodiment, polyhedrons are not limited to those shown in FIG. 23, and projection images may be generated by using various polyhedrons Processes of processing the director's view region for efficiently encoding, decoding, and rendering the omnidirectional spherical image have been described. Also, various methods of reshaping the projection images have been described in addition to the polyhedron projection method. However, in addition to the above descriptions, one or more embodiments may be used to improve the image processing efficiency. Other embodiments for improving the image processing efficiency will be described below. The embodiments below may be combined with the embodiments of FIGS. 2 to 23.

Figure 24:
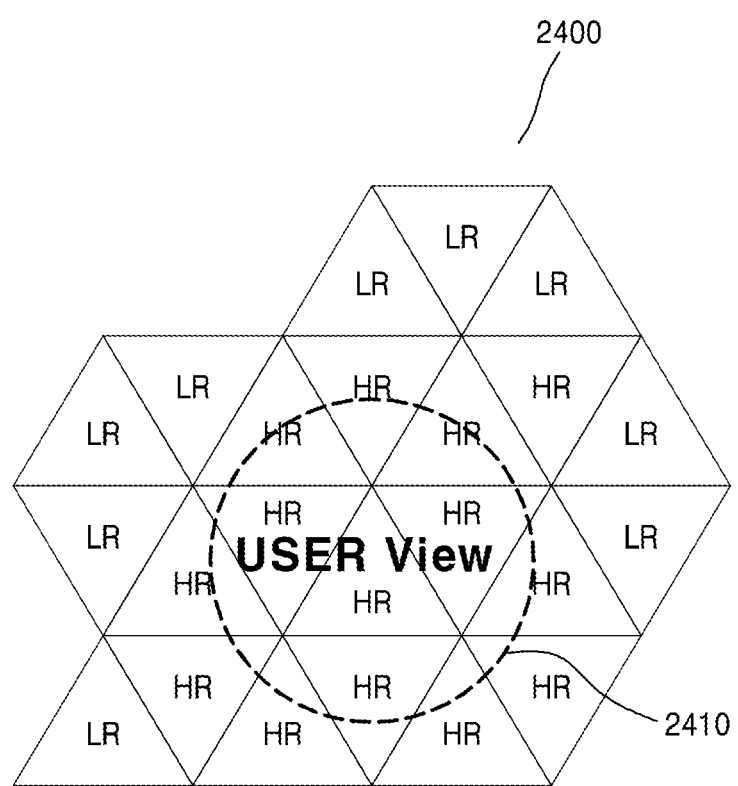
FIG. 24 is a diagram of a method of determining reconstruction quality of an image based on a field of view of a user, according to an embodiment.

FIG. 24 is a diagram of a method of determining reconstruction quality of an image based on a field of view of a user, according to an embodiment.

The present specification discloses a method of processing, for the efficient image processing, a director's view image showing a smaller area than an omnidirectional spherical image, instead of processing the entire omnidirectional spherical image. However, a field of view of a user wearing a VR apparatus such as an HMD may be narrower than that of a director's view (e.g., 180°×180°) Therefore, when compression quality and reconstruction quality are determined by distinguishing a region within the field of view of the user from a region outside the field of view of the user, images may be efficiently processed.

Referring to FIG. 24, the field of view 2410 of the user is narrower than that of an image 2400 of the entire area processed by the image processing apparatus. According to an embodiment, the image processing apparatus may analyze the field of view 2410 of the user in the image 2400 and may perform compression and reconstruction in high quality on regions corresponding to the field of view 2410. In addition, the image processing apparatus according to an embodiment may perform compression and reconstruction in low quality on regions of the image 2400 outside the field of view 2410.

Figure 25:
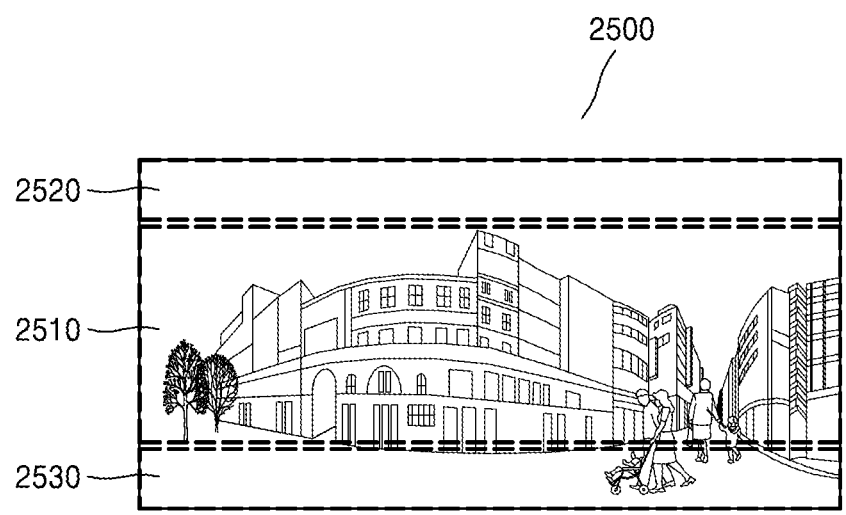
FIG. 25 is a diagram of a method of synthesizing an artificial image with an original image, according to an embodiment.

FIG. 25 is a diagram of a method of synthesizing an artificial image with an original image, according to an embodiment.

With regard to the omnidirectional spherical image, the user wearing the VR apparatus may look at the ambient environment. The user wearing the VR apparatus needs to receive appropriate images even when the user redirects his/her gaze in virtual reality. Therefore, the image processing apparatus has to obtain a 360°×180° panoramic image by using a camera. However, processing the 360°×180° panoramic image to generate the omnidirectional spherical image may require a considerable amount of operations.

A direction of eyes of the user wearing the VR apparatus is usually horizontal. It is because important content or an object drawing the user's attention is mostly arranged on the central portion of the image (that is, a horizontal direction) while the 360°×180° panoramic image is obtained. In other words, a possibility that the user looks at an upper portion (the sky) or a lower portion (the ground) of the 360°×180° panoramic image is relatively low. In addition, a sky or ground region have relatively low complexity.

By considering the above points, the image processing apparatus may replace a certain region of the 360°×180° panoramic image with an artificial image. For example, the image processing apparatus may process the image by removing content of the sky or ground region. Thus, the amount of data that the image processing apparatus processes may decrease. Also, during image reconstruction, the image processing apparatus may simply reconstruct the image by replacing the removed region with an artificial image.

Referring to FIG. 25, artificial images are synthesized with original images in certain regions 2520 and 2530, except for an irreplaceable region 2510 of a 360°×180° panoramic image 2500. Accordingly, the image processing apparatuses may does not need to process pieces of image data corresponding to the certain regions 2520 and 2530.

The embodiments of the present disclosure can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), etc.

While this disclosure has been particularly shown and described with reference to embodiments thereof, it will be understood by one of ordinary skill in the art that various changes in form and details may be made therein without departing from the spirit and scope of the disclosure as defined by the appended claims. Therefore, the embodiments should be considered in descriptive sense only and not for purposes of limitation.

The invention claimed is:

1. An image processing method comprising:
generating an omnidirectional spherical image;
determining information regarding a director's view that indicates some regions of the omnidirectional spherical image;
generating a projection image by projecting the omnidirectional spherical image to a development view of a polyhedron;
dividing, from the projection image, a director's view projection image corresponding to the director's view, based on the information regarding the director's view;
when the projection image is an icosahedral projection image, reshaping the director's view projection image into a director's view rectangular image by determining, for each row of the director's view projection image, a vertical movement direction of pixels included in the each row, and vertically moving, in an upward or downward direction, the pixels included in the each row according to the determined vertical movement direction; and
generating a bitstream into which the director's view rectangular image is encoded.

2. The image processing method of claim 1, wherein the information regarding the director's view is included in Supplemental Enhancement Information (SEI) parameters of a Network Abstraction Layer (NAL) unit within the bitstream.

3. An image processing method comprising:
generating an omnidirectional spherical image;
determining information regarding a director's view that indicates some regions of the omnidirectional spherical image;
generating a projection image by projecting the omnidirectional spherical image to a development view of a polyhedron;
dividing, from the projection image, a director's view projection image corresponding to the director's view, based on the information regarding the director's view;
when the projection image is the octahedral projection image, reshaping the director's view projection image into a director's view rectangular image by
determining, for each row of the director's view projection image, a first movement direction of pixels included in the each row,
moving in parallel the pixels included in the each row in a diagonal direction, according to the determined first movement direction,
determining, for each column, a second movement direction of pixels included in each column of the director's view projection image, and
horizontally moving, in a left or right direction, the pixels included in the each column according to the determined second movement direction; and
generating a bitstream into which the director's view rectangular image is encoded.

4. An image processing method comprising:
receiving a bitstream that is encoded;
obtaining, from the bitstream, reshaping information, polyhedron information, and information regarding a director's view indicating some regions of an omnidirectional spherical image;
generating a director's view rectangular image by decoding the bitstream;
based on the reshaping information and the information regarding the director's view, reconstructing a director's view projection image by moving a location of at least one of pixels of the director's view rectangular image;
based on the polyhedron information, generating a back-projection image by assembling the director's view projection image as a polyhedron and back-projecting the polyhedron;
receiving information regarding an image mode indicating whether to reproduce an image in a full mode or a director's view mode;
when the information regarding the image mode indicates the full mode, generating a rectangular image of the omnidirectional spherical image by decoding the bitstream, reconstructing the projection image of the omnidirectional spherical image by moving a location of at least one of pixels of the rectangular image of the omnidirectional spherical image, and reproducing the omnidirectional spherical image by back-projecting the projection image of the omnidirectional spherical image; and
when the information regarding the image mode indicates the director's view mode, reproducing an image according to the director's view by back-projecting the projection image of the omnidirectional spherical image.

5. The image processing method of claim 4, wherein a region of the director's view rectangular image, which corresponds to a field of view of a user device, is reconstructed in high quality, and a region outside the field of view of the user device is reconstructed in low quality.

* * * * *